(12) United States Patent
Biffle et al.

(10) Patent No.: US 8,917,995 B1
(45) Date of Patent: Dec. 23, 2014

(54) BALLOON ENVELOPE WITH INTEGRATED RECEIVER

(71) Applicants: Cliff Biffle, Berkeley, CA (US); Richard Wayne DeVaul, Mountain View, CA (US); Joshua Weaver, Mountain View, CA (US); Anton Valdemar Staaf, San Jose, CA (US); Eric Teller, Palo Alto, CA (US); Michael Cassidy, Menlo Park, CA (US)

(72) Inventors: Cliff Biffle, Berkeley, CA (US); Richard Wayne DeVaul, Mountain View, CA (US); Joshua Weaver, Mountain View, CA (US); Anton Valdemar Staaf, San Jose, CA (US); Eric Teller, Palo Alto, CA (US); Michael Cassidy, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 13/674,052

(22) Filed: Nov. 11, 2012

(51) Int. Cl.
*H04B 10/112* (2013.01)

(52) U.S. Cl.
CPC ................................ *H04B 10/1129* (2013.01)
USPC ............. 398/125; 359/879; 359/837; 398/42; 343/832

(58) Field of Classification Search
CPC .................................................. H04B 10/1129
USPC ............ 398/115, 118, 124, 125, 128; 359/87, 359/837, 429
See application file for complete search history.

(56) References Cited

U.S. PATENT DOCUMENTS

| | | | | |
|---|---|---|---|---|
| 4,394,780 A | * | 7/1983 | Mooradian | 398/125 |
| 6,386,718 B1 | * | 5/2002 | Qian | 359/879 |
| 6,513,758 B1 | * | 2/2003 | Lloyd | 244/129.1 |
| 6,925,256 B1 | * | 8/2005 | Heiney | 398/42 |
| 2003/0020667 A1 | * | 1/2003 | Essig et al. | 343/832 |
| 2005/0195505 A1 | * | 9/2005 | Braun et al. | 359/837 |
| 2008/0265149 A1 | * | 10/2008 | Endoh et al. | 250/237 R |

* cited by examiner

*Primary Examiner* — David Payne
*Assistant Examiner* — Omar S Ismail
(74) *Attorney, Agent, or Firm* — McDonnell Boehnen Hulbert & Berghoff LLP.

(57) ABSTRACT

A balloon envelope with an integrated receiver. In an example embodiment, a balloon includes: (i) an envelope including one or more signal passing sections, each of the one or more signal-passing sections being configured to allow a signal to pass through; (ii) at least one signal receiver corresponding to a particular one of the one or more signal passing sections; and (iii) at least one signal-directing surface located within the envelope and corresponding to the particular one of the one or more signal-passing sections, the at least one signal-directing surface being configured to receive the signal and direct the signal towards the at least one signal receiver.

24 Claims, 15 Drawing Sheets

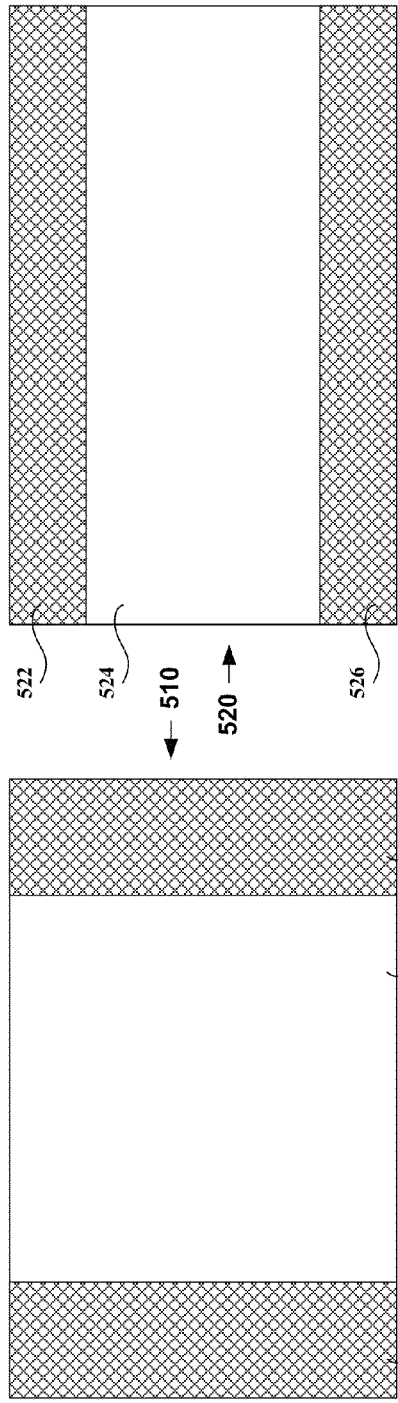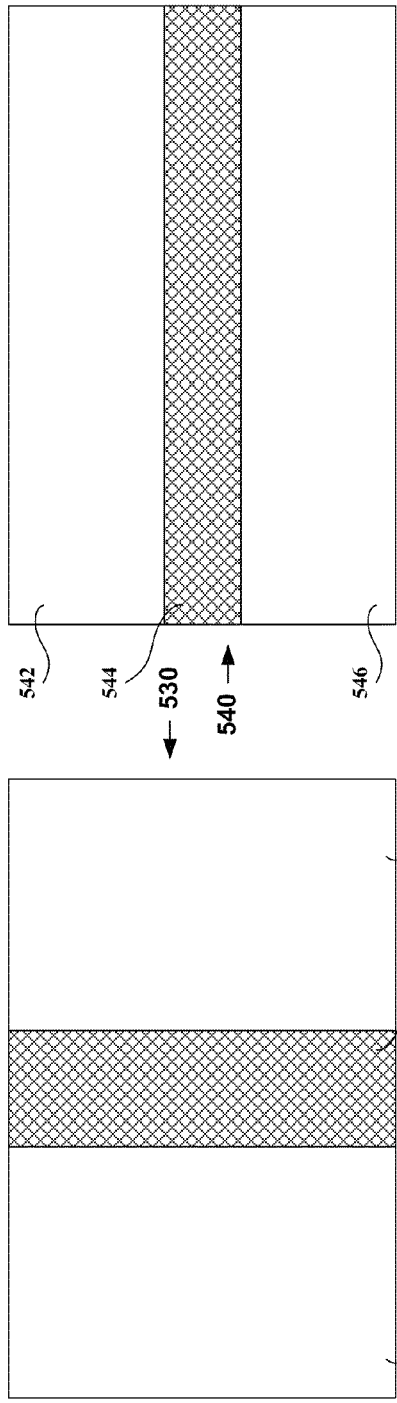

BALLOON ENVELOPE WITH INTEGRATED RECEIVER

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a balloon includes: (i) an envelope including one or more signal-passing sections, each of the one or more signal-passing sections being configured to allow a signal to pass through; (ii) at least one signal receiver corresponding to a particular one of the one or more signal-passing sections; and (iii) at least one signal-directing surface located within the envelope and corresponding to the particular one of the one or more signal-passing sections, the at least one signal-directing surface being configured to receive the signal and direct the signal towards the at least one signal receiver.

In another aspect, a computer-implemented method involves: (i) receiving a signal at a balloon, where the balloon includes: (a) an envelope including one or more signal-passing sections, each of the one or more signal-passing sections being configured to allow a signal to pass through; (b) at least one signal receiver corresponding to a particular one of the one or more signal-passing sections; and (c) at least one signal-directing surface located within the envelope and corresponding to the particular one of the one or more signal-passing sections, the at least one signal-directing surface being configured to receive the signal and direct the signal towards the at least one signal receiver; and (ii) based on the received signal, determining a second position that is different from the first position; and (iii) causing the at least one signal-directing surface to move such that it is in the second position.

In yet another aspect, a balloon includes: (i) an envelope including one or more signal-passing sections, each of the one or more signal-passing sections being configured to allow a signal to pass through; (ii) at least one signal receiver corresponding to a particular one of the one or more signal-passing sections; and (iii) at least one signal-directing surface located on the surface of the envelope and corresponding to the particular one of the one or more signal-passing sections, the at least one signal-directing surface being configured to receive the signal and direct the signal towards the at least one signal receiver.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 5A through 5D are simplified illustrations of example signal-passing sections of a balloon envelope.

DETAILED DESCRIPTION

Figure 1:
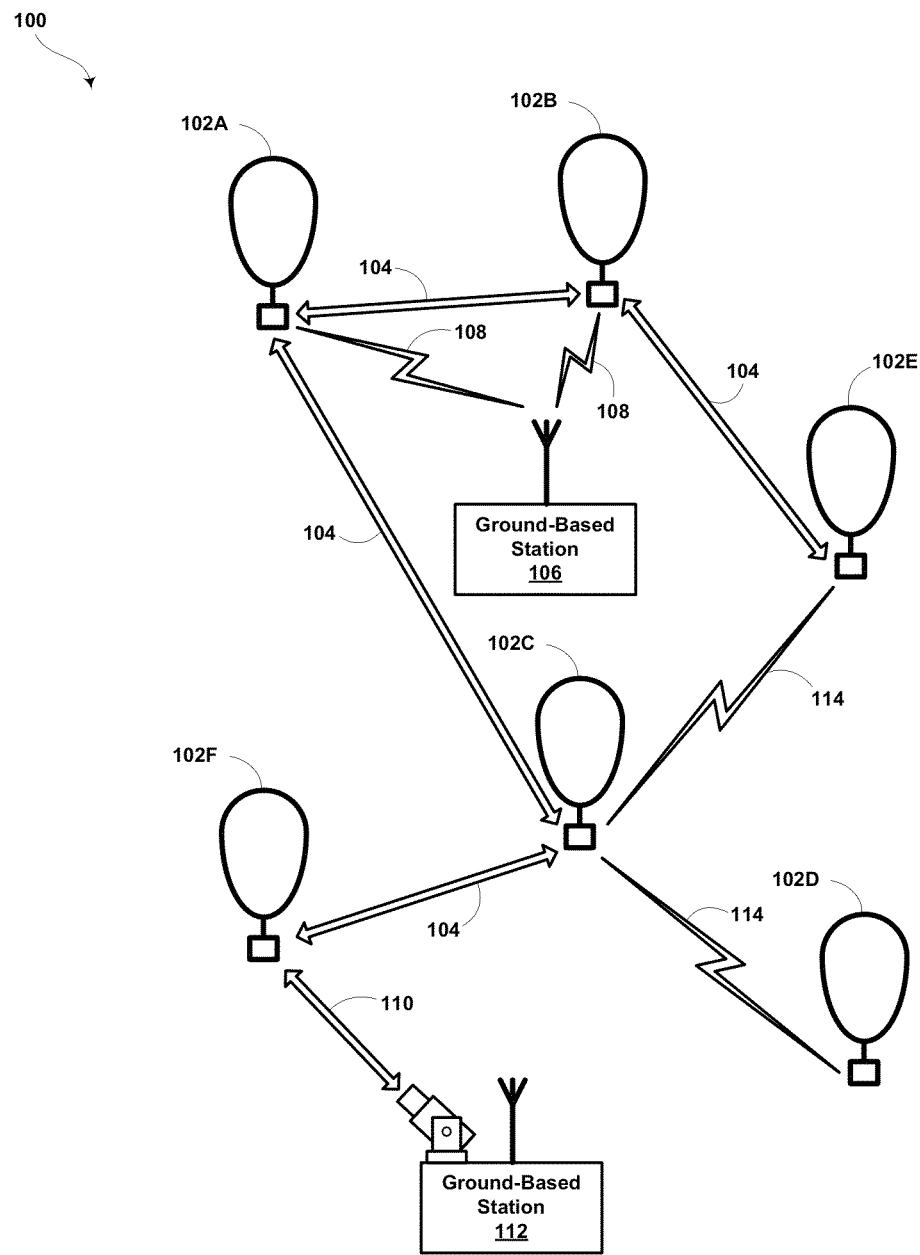
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures, and the corresponding discussions thereof, should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. OVERVIEW

Illustrative embodiments help to provide a data network that includes a plurality of balloons; for example, an ad-hoc network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space communications. For example, balloon-to-balloon free-space communication links may be implemented using optical signals or RF signals, among other suitable types of communication signals. For instance, balloons may be configured for optical communications using ultra-bright LEDs (which may also be referred to as "high-power" or "high-output" LEDs). In addition, the balloons may communicate with ground-based station(s) using radio-frequency (RF) communications. It should be understood, however, that balloons may be configured for communications using other components and/or devices as well. As but one additional example, balloons may be configured for communications using lasers.

In the context of a balloon network, embodiments described herein may generally help to maintain, and/or improve the quality of, a communication link for a given balloon. More particularly, embodiments described herein may help a balloon direct one or more signals towards a respective signal receiver of the balloon, so that the one or more signals may be received with improved fidelity. Accordingly, embodiments may include one or more signal-directing surfaces that are used to direct one or more signal towards a respective signal receiver.

As a specific example, consider a balloon envelope that contains within its interior volume at least one signal receiver. A section of the balloon envelope may be configured to pass signals of the type that the signal receiver is configured to receive. For instance, a transparent or translucent section of the balloon envelope may allow optical signals to pass through the envelope to an optical receiver inside of the envelope. Additionally or alternatively, a section of the balloon envelope may be configured to pass RF signals through to an RF receiver inside of the envelope. In a further aspect, a given section of the balloon envelope (or portion thereof) may be configured to block, or attenuate, other types of signals. For instance, a portion of the envelope may be configured to both block RF signals and pass optical signals.

As noted, the balloon envelope may also contain within its interior volume at least one signal-directing surface that is configured to direct signals towards a signal receiver inside of the envelope. The signal-directing surface may include, for example, a reflective surface. For instance, the signal-directing surface may be configured to reflect optical and/or RF signals. In an embodiment, the signal-directing surface may include a diffraction grating that is configured to reflect optical and/or RF signals at a desired angle towards a signal receiver. Further, the diffraction grating may be configured to direct other types of undesired signals away from the signal receiver.

Moreover, the signal-directing surface may be physically movable. Thus, a control system within the balloon may move the signal-directing surface to change the direction in which a signal is directed by the signal-directing surface. In this way, the control system may help dynamically direct one or more signals towards a respective signal receiver so that the one or more signals may be received with improved fidelity.

II. BALLOON NETWORK EXAMPLES

In some embodiments, a high-altitude-balloon network may be homogenous. That is, the balloons in a high-altitude-balloon network could be substantially similar to each other in one or more ways. More specifically, in a homogenous high-altitude-balloon network, each balloon may be configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations. Other differences could be present between balloons in a heterogeneous balloon network.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as an ad-hoc network for packet-data communications. Further, balloons 102A to 102F may be configured for RF communications with ground-based stations 106 and 112 via RF links 108. In another example embodiment, balloons 102A to 102F could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 25 km may vary with latitude and by season, the variations can be modelled in a reasonably accurate manner. Additionally, altitudes above 17 km are typically above the maximum flight level designated for commercial air traffic. Therefore, interference with commercial flights is not a concern when balloons are deployed between 17 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to additional figures.

In a further aspect, balloons 102A to 102F may utilize one or more of various different RF air-interface protocols for communication ground-based stations 106 and 112 via RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F could be configured as a downlink balloon. Like other balloons in an example network, a downlink balloon 102F may be operable for optical communication with other balloons via optical links 104. However, downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 104. Other forms are also possible.

Balloons could be configured to establish a communication link with space-based satellites in addition to, or as an alternative to, a ground-based communication link.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102F over an RF link 108. As such, ground-based stations 106 and 112 may be configured as an access point with which various devices can connect to balloon network 100. Ground-based stations 106 and 112 may have other configurations and/or serve other purposes without departing from the scope of the invention.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

A. Ad-Hoc Network Functionality

As noted, balloons 102A to 102F may collectively function as an ad-hoc network. More specifically, since balloons 102A to 102F may communicate with one another using free-space optical links, the balloons may collectively function as a free-space optical ad-hoc network.

In an ad-hoc network configuration, each balloon 102A to 102F may function as a node of the ad-hoc network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as an ad-hoc network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent ad-hoc network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical ad-hoc network that is opaque. In an opaque configuration, some or all of balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

B. Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons area distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
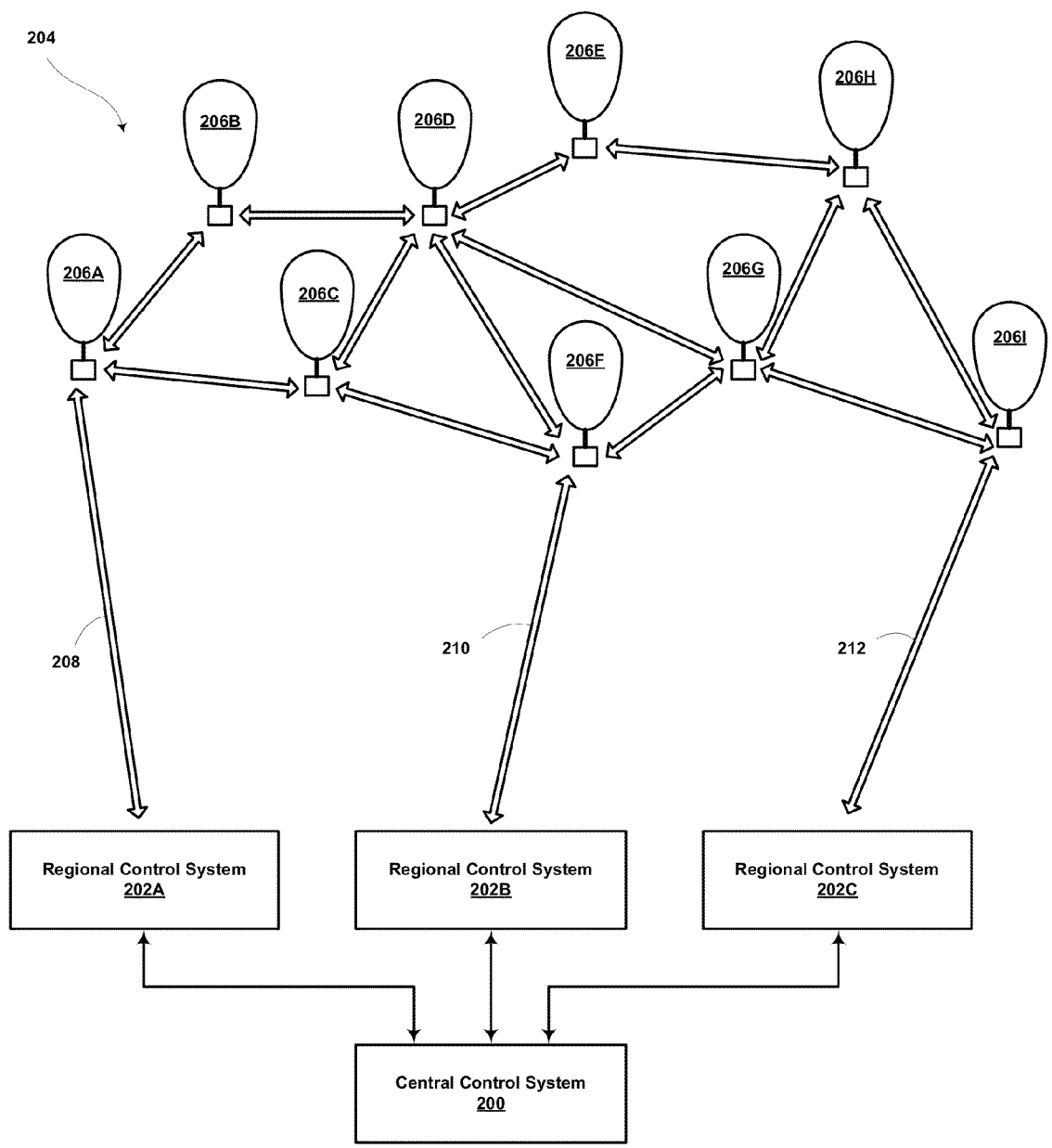
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, where only some of balloons 206A to 206I are configured as downlink balloons, the balloons 206A, 206F, and 206I that are configured as downlink balloons may function to relay communications from central control system 200 to other balloons in the balloon network, such as balloons 206B to 206E, 206G, and 206H. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202C may in fact just be particular type of ground-based station that is configured to communicate with downlink balloons (e.g. the ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain ad-hoc networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain ad-hoc networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_j$, wherein $d_j$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

III. ILLUSTRATIVE BALLOON SYSTEMS

A. Illustrative Balloon Systems

Figure 3:
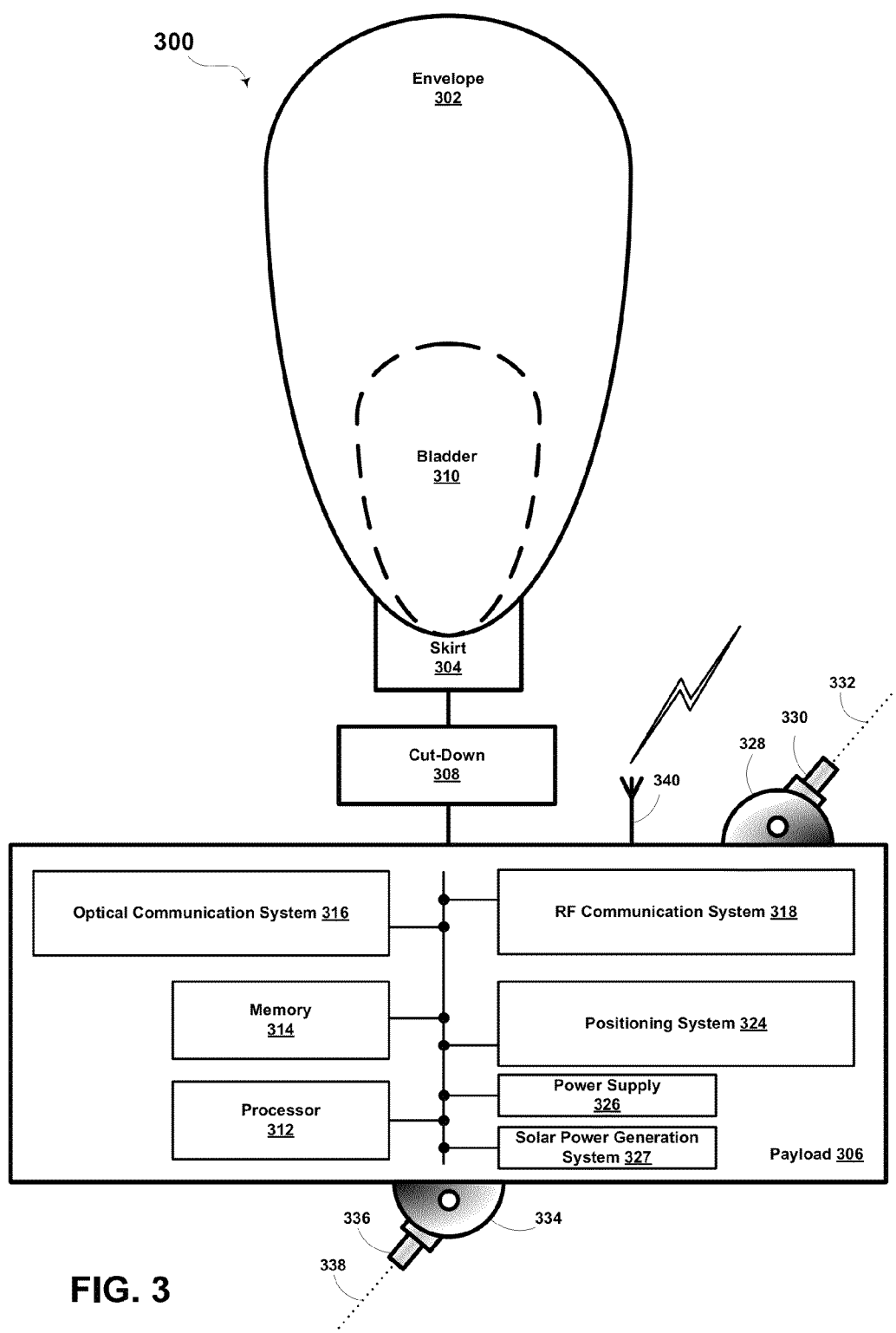
FIG. 3 is a simplified block diagram illustrating a balloon, according to an example embodiment.

Various types of balloon systems may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. In one example embodiment, the envelope and/or skirt could be made of metalized Mylar or BoPet. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The memory 314 may have instructions stored thereon, which can be accessed and executed by the processor 312 in order to carry out the balloon functions described herein. Further, the processor 312, in conjunction with program instructions stored in memory 314, and/or other components, may function as a control system of balloon.

The payload 306 of balloon 300 may also include various other types of equipment and systems to provide a number of different functions. For example, payload 306 may include an optical communication system 316, which may control transmission and/or reception of optical signals to and/or from other balloons. Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an optical communication system 316 for free-space optical communication with other balloons. As such, optical communication system 316 may be configured to transmit a free-space optical signal by modulating a laser or ultra-bright LED system. The optical communication system 316 may be implemented with mechanical systems and/or with hardware, firmware, and/or software. Generally, the manner in which an optical communication system is implemented may vary, depending upon the particular application. In the illustrated example, optical communication system 316 is configured to operate optical-optical-communication components 330 and 336. Within the context of this disclosure, the optical-communication components 330 and 336 may include an optical transmitter, an optical receiver, and/or an optical transceiver.

In the illustrated example, optical-communication components 330 and 336 are mechanically and/or optically coupled to gimbal mounts 328 and 334, respectively. The gimbal mounts 328 and 334 may be configured to position the optical-communication components 330 and 336, respectively, such as by pointing the respective optical-communication components 330 or 336 in a pointing direction 332 or 338, respectively.

Further, optical-communication component 330 may be configured to maintain an optical link with a first neighbouring balloon while optical-communication component 336 may be configured to maintain an optical link with a second neighbouring balloon or a ground-based station. In other words, one or more optical-communication components could be used with respective pointing mechanisms in an effort to maintain optical links with one or more ground-, air-, or space-based network nodes.

Note that the location of optical-communication components on the payload, optical-communication components 330 and 336 may vary from that illustrated in FIG. 3. Further, various different electronic and/or mechanical systems may be used to position optical-communication components by e.g., changing a pointing direction and/or changing a location of an optical-communication component on the payload. Further, optical-communication components may be included in the balloon envelope, as further discussed below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. An electrical current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

IV. ILLUSTRATIVE BALLOONS

Figure 4A:
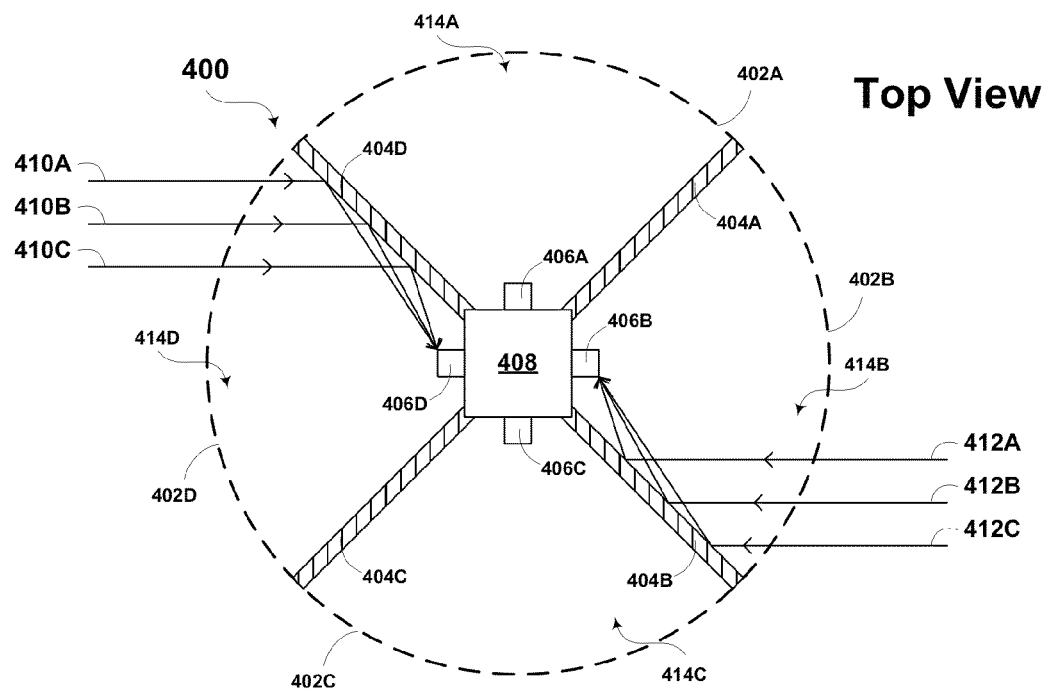
FIGS. 4A and 4B are simplified illustrations of a first example balloon envelope with integrated receivers.
Figure 4B:
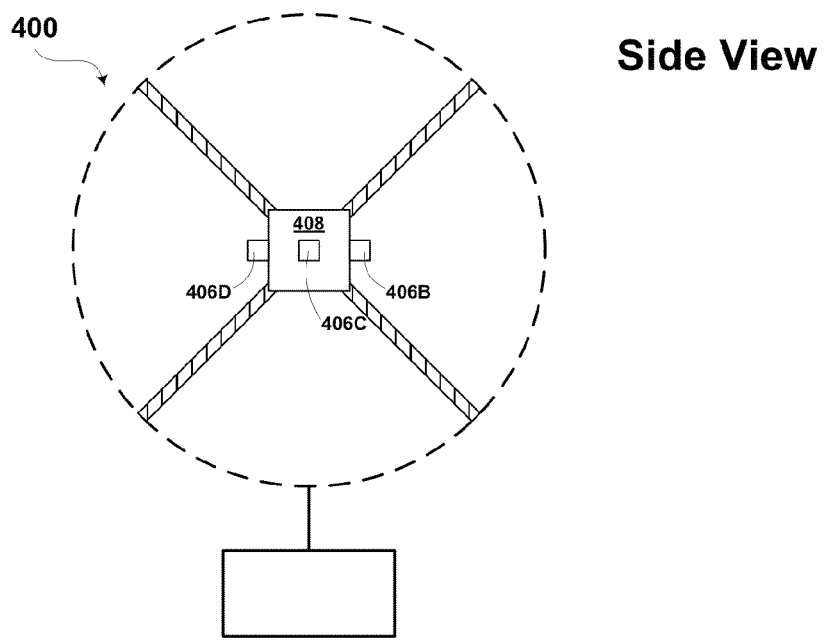

FIGS. 4A and 4B each show a simplified block diagram of an example balloon with integrated signal receivers. As shown, the example balloon includes an envelope 400 that includes signal-passing sections 402A through 402D, signal-directing surfaces 404A through 404D, and signal receivers 406A through 406D. Also shown in FIG. 4A is signal-receiver controller 408 that may be used to control signal receivers 406A through 406D and/or analyse or otherwise process signals received by signal receivers 406A through 406D.

As shown, the example balloon shown in FIGS. 4A and 4B, and various components thereof, may be arranged to direct and ultimately receive signals 410A through 410C and signals 412A through 412C. In particular, each of signals 410A through 410C are shown as passing through signal-passing section 402D and incident on signal-directing surface 404D, where signal-directing surface 404D corresponds to signal-passing section 402D and is located within the envelope of balloon 400. Further, signal receiver 406D corresponds to signal-passing section 402D. And, upon reflection off of signal-directing surface 404D, each of signals 410A through 410C are directed towards signal receiver 406D.

Similarly, each of signals 412A through 412C are shown as passing through signal-passing section 402B and incident on signal-directing surface 404B, where signal-directing surface 404B corresponds to signal-passing section 402B and is located within envelope 400 of the example balloon. Further, signal receiver 406B corresponds to signal-passing section 402B. And, upon reflection off of signal-directing surface 404B, each of signals 412A through 412C are directed towards signal receiver 406B.

The example balloon depicted in FIGS. 4A and 4B, including various aspects, elements, and components thereof, is discussed further in the sections that follow.

A. Illustrative Signal-Passing Sections

As shown in FIG. 4A, example envelope 400 includes example signal-passing sections 402A through 402D. Each signal-passing section generally corresponds to at least one signal receiver. For instance, signal-passing section 402A corresponds to signal receiver 406A, signal-passing section 402B corresponds to signal receiver 406B, signal-passing section 402C corresponds to signal receiver 406C, and signal-passing section 402D corresponds to signal receiver 406D.

Further, each signal-passing section generally corresponds to at least one signal-directing surface. For instance, signal-passing section 402A corresponds to signal-directing surfaces 404A and 404D, signal-passing section 402B corresponds to signal-directing surfaces 404A and 404B, signal-passing section 402C corresponds to signal-directing surfaces 404B and 404C, and signal-passing section 402D corresponds to signal-directing surfaces 404C and 404D. In an embodiment, the size of a given signal-passing section may generally be defined by edges of the signal-directing surfaces that are in contact with the given signal-passing section. For instance, signal-passing section 402A may be defined by the edges of signal-directing surfaces 404A and 404D that are in contact with the signal-passing section.

In an embodiment, each signal-passing section may be of substantially the same surface area. For instance, each of signal-passing section 402A through 402D may be of substantially the same surface area. However, this is not necessary; each signal-passing section may be of any suitable size. Further, as discussed further below, the size of each signal-passing section may vary in time depending on the position of the signal-directing surfaces that correspond to the signal-passing section.

As noted, each signal-passing section may be configured to pass one or more signals into the interior of envelope 400 for receipt by one or more signal receivers. For instance, a given signal-passing section may be at least partially made of a material that is at least partially translucent. In this way, the signal-passing section may be configured to pass optical signals. Examples of materials that are at least partially translucent and that may be used in a signal-passing section include glass, plexiglass or acrylic glass (such as poly(methyl methacrylate)), plastic (such as acetates, polycarbonate, polyester, etc.), among other examples.

Additionally or alternatively, a given signal-passing section may be at least partially made of a material that at least partially passes RF signals. In this way, the signal-passing section may be configured to pass RF signals. As a general matter, materials that at least partially pass RF signals include materials with a relatively low dielectric constant or a relatively low attenuation coefficient. Examples of materials that at least partially pass RF signals include fabrics containing little or no metallic and/or conductive elements, among other examples.

Further, it should be understood that the signal-passing section may pass a signal while at the same time partially attenuating the signal, or in some other manner modifying the signal. For instance, in an embodiment, the signal-passing section may reduce the intensity of the signal. In another embodiment, the signal-passing section may filter the signal. For instance, the signal-passing section may be configured to both block RF signals and pass optical signals.

FIGS. 5A through 5D are simplified illustrations of example signal-passing sections of a balloon envelope. As shown, a given signal-passing section may include portions that are configured to pass signals, while other portions may be configured to not pass signals. The examples shown in FIGS. 5A through 5D are discussed below with respect to the passing of optical signals. However, it should be understood that this is for purposes of example and explanation and that the examples described could just as well apply to signal-passing sections that are configured to pass RF signals.

As shown in FIG. 5A, example signal-passing section 510 may include translucent portion 514 that at least partially passes optical signals and opaque portions 512 and 516 that blocks optical signals. Opaque portions 512 and 516 are arranged vertically along respective edges of signal-passing section 510 such that optical signals may pass through translucent portion 514 in the horizontal middle of signal-passing section 510.

As shown in FIG. 5B, example signal-passing section 520 may include translucent portion 524 that at least partially passes optical signals and opaque portions 522 and 526 that block optical signals. Opaque portions 522 and 526 are arranged horizontally along respective edges of signal-passing section 520 such that optical signals may pass through translucent portion 524 in the vertical middle of signal-passing section 520.

As shown in FIG. 5C, example signal-passing section 530 may include translucent portions 532 and 536 that at least partially pass optical signals and opaque portion 534 that blocks optical signals. Opaque portion 534 is arranged vertically in the middle of signal-passing section 530 such that optical signals may pass through translucent portions 532 and 536 along respective vertical edges of signal-passing section 530.

And as shown in FIG. 5D, example signal-passing section 540 may include translucent portions 542 and 546 that at least partially pass optical signals and opaque portion 544 that blocks optical signals. Opaque portion 544 is arranged horizontally in the middle of signal-passing section 540 such that optical signals may pass through translucent portions 542 and 546 along respective horizontal edges of signal-pass section 540.

It should be noted that although particular example configurations of signal-passing sections are illustrated in FIGS. 5A through 5D, such example configurations are shown for purposes of example and explanation only. The example configurations shown in FIGS. 5A through 5D should not be taken to be limiting. Other suitable configurations of signal-passing sections may exist as well.

B. Illustrative Signal-Directing Surfaces

With reference again to FIG. 4A, example envelope 400 includes example signal-directing surfaces 404A through 404D. In an embodiment, a given signal-directing surface may be made of any suitable material that generally reflects signals such as signals 410A through 410C and/or signals 412A through 512C. Examples of such reflective materials may include glass, silica, aluminium, gold, copper, and/or silver, among many other examples. Further, it should be understood that the surface of a signal-directing surface may be coated using any suitable substrate.

In an embodiment, a given signal-directing surface may include a diffraction grating configured to direct light in a desired direction. For example, a signal-directing surface may include a reflective, diffractive, grating that directs signals towards a signal receiver.

Figure 6A:
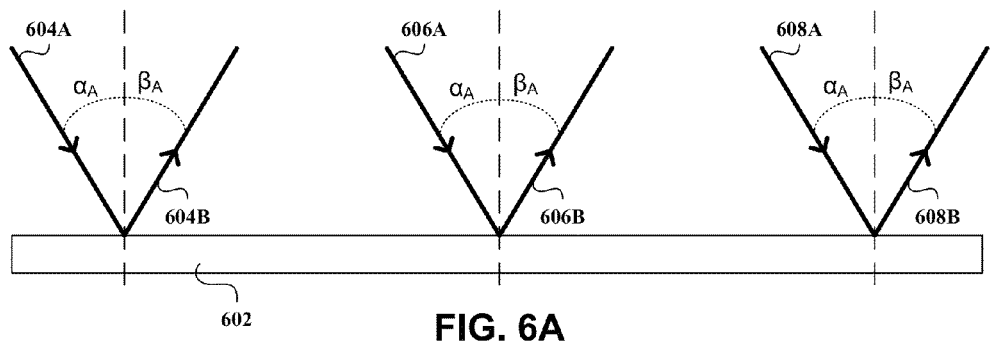
FIGS. 6A through 6E are simplified illustrations of example signal-directing surfaces.

FIGS. 6A through 6E are simplified illustrations of example signal-directing surfaces. FIG. 6A depicts an example signal-directing surface 602 that is reflective and uniform. As shown, signal-directing surface 602 does not include a diffraction grating. Signal-directing surface 602 may be any suitable mirror. Each of example incident signals 604A, 606A, and 608A are redirected by signal-directing surface 602 at equal angles of reflection. In particular, incident signal 604A is associated with an angle of incidence $\alpha_A$ relative to normal. And reflected signal 604B is associated with an angle of reflection $\beta_A$ relative to normal. Similarly, each of example incident signals 606A and 608A are associated with an angle of incidence $\alpha_A$ relative to normal. And reflected signals 606B and 608B are associated with an angle of reflection $\beta_A$ relative to normal.

Figure 6B:
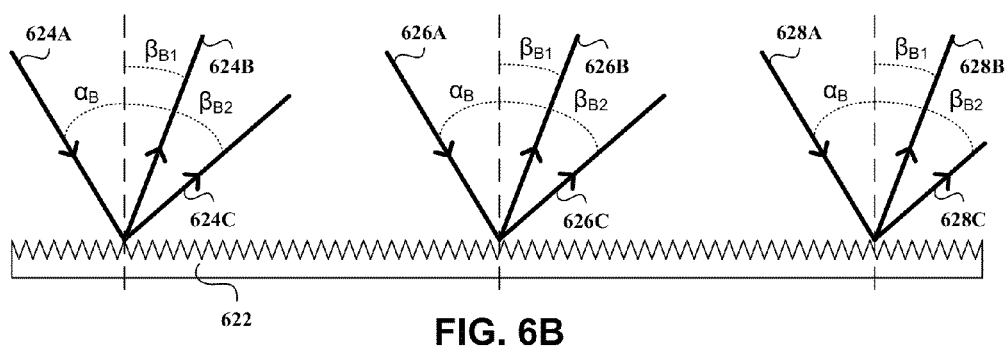

FIG. 6B depicts an additional example signal-directing surface 622 that is reflective and uniform. As shown, signal-directing surface 622 includes a diffraction grating. As a general matter, diffraction gratings are periodic structures that split and diffract light into several beams travelling in different directions. The directions of the diffracted (or reflected) beams depend on the structure of the grating, the spacing of the grating, and the wavelength of the incident signal, among other aspects of the signal-directing surface.

Each of example incident signals 624A, 626A, and 628A are redirected by signal-directing surface 622 at equal angles of reflection. Further each of example incident signals 624A, 626A, and 628A are diffracted into two respective reflected signals. It should be understood, however, that the diffracted reflected signals shown are for purposes of example and explanation only. Additional diffracted reflected signals, at different angles of reflection, may be present as well.

Incident signal 624A is associated with an angle of incidence $\alpha_B$ relative to normal. Upon reflection, signal 624A is diffracted into reflected signal 624B associated with an angle of reflection $\beta_{B1}$ relative to normal and reflected signal 624C associated with an angle of reflection $\beta_{B2}$ relative to normal. Reflected signal 624B may be characterized by a first wavelength, and reflected signal 624C may be characterized by a second wavelength.

Similarly, incident signal 626A is associated with an angle of incidence $\alpha_B$ relative to normal. Upon reflection, signal 626A is diffracted into reflected signal 626B associated with an angle of reflection $\beta_{B1}$ relative to normal and reflected signal 626C associated with an angle of reflection $\beta_{B2}$ relative to normal. Reflected signal 626B may be characterized by a first wavelength, and reflected signal 626C may be characterized by a second wavelength.

And similarly, incident signal 628A is associated with an angle of incidence $\alpha_B$ relative to normal. Upon reflection, signal 628A is diffracted into reflected signal 626B associated with an angle of reflection $\beta_{B1}$ relative to normal and reflected signal 628C associated with an angle of reflection $\beta_{B2}$ relative to normal. Reflected signal 628B may be characterized by a first wavelength, and reflected signal 628C may be characterized by a second wavelength.

Figure 6C:
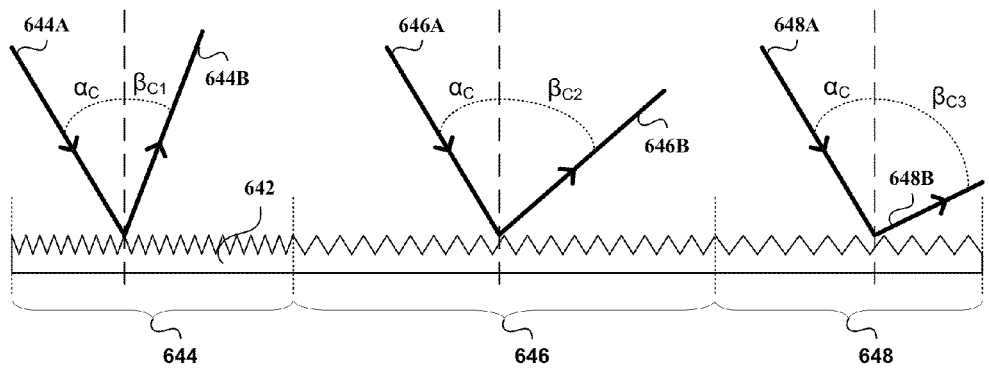

FIG. 6C depicts an additional example signal-directing surface 642 that is reflective and non-uniform. As shown, signal-directing surface 642 includes a diffraction grating. Further, signal-directing surface 642 includes multiple diffractive sections 644, 646, and 648, each having a unique respective diffractive structure. As a general matter, the respective diffractive structures of diffractive sections 644, 646, and 648 reflect light at various respective angles. And each of example incident signals 644A, 646A, and 648A may be diffracted into two or more respective reflected signals (although only a single reflected signal is shown). It should be understood that the reflected signals shown are for purposes of example and explanation only. Additional diffracted reflected signals, at different angles of reflection, may be present as well.

Incident signal 644A is associated with an angle of incidence $\alpha_C$ relative to normal. Upon reflection, signal 644A is diffracted into reflected signal 644B associated with an angle of reflection $\beta_{C1}$ relative to normal.

Incident signal 646A is associated with an angle of incidence $\alpha_c$ relative to normal. Upon reflection, signal 646A is diffracted into reflected signal 646B associated with an angle of reflection $\beta_{C2}$ relative to normal. As shown, because the diffractive structure of diffractive section 646 is different from the diffractive structure of diffractive section 644, angle $\beta_{C2}$ is different from angle $\beta_{C1}$.

Incident signal 648A is associated with an angle of incidence $\alpha_C$ relative to normal. Upon reflection, signal 648A is diffracted into reflected signal 648B associated with an angle of reflection $\beta_{C3}$ relative to normal. As shown, because the diffractive structure of diffractive section 648 is different from the respective diffractive structures of diffractive sections 644 and 646, angle $\beta_{C3}$ is different from angle $\beta_{C1}$ and $\beta_{C2}$.

Figure 6D:
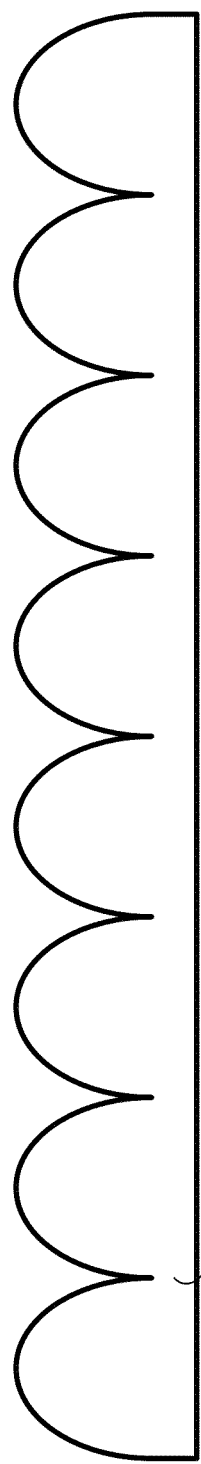
Figure 6E:
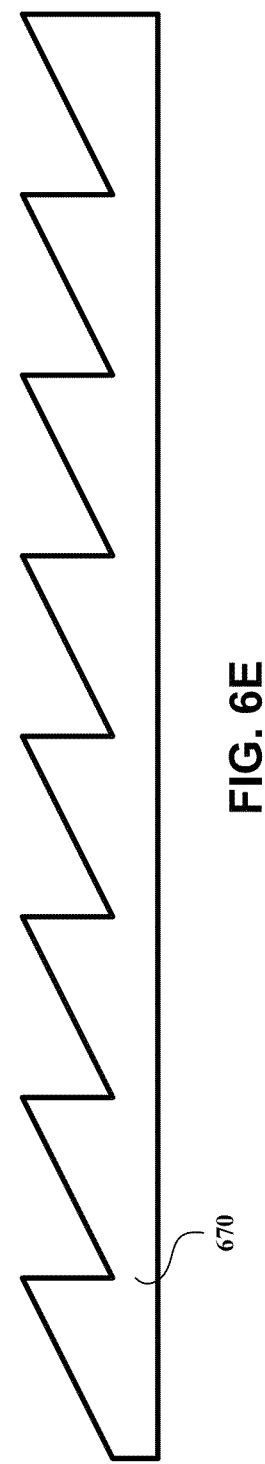

It is of note that while the diffractive structure depicted with respect to signal-directing surfaces 622 and 642 are of a given geometry, other geometries are possible as well. For instance, an alternative diffractive geometry is shown in FIG. 6D with respect to example signal-directing surface 660. And another alternative diffractive geometry is shown in FIG. 6E with respect to example signal-directing surface 670. As a general matter, the diffractive geometry and/or structure of a given signal-directing surface may be configured so as to achieve desired reflective and diffractive properties. The example diffractive geometries shown in each of FIGS. 6B-6E are set forth for purposes of example and explanation only, and should not be taken to be limiting. It should be understood that any suitable diffractive geometry and/or structure may be used.

Also, while certain embodiments are shown as including a signal directing surface on the inside of the balloon envelope, in other embodiments, one or more signal-directing surfaces may additionally and/or alternatively be located on the surface of the balloon envelope. In such an embodiment, the signal-directing surface may be rigidly or flexibly attached to the surface of the envelope, such that the signal-directing surface is configured to reflect signals through a corresponding signal-passing section towards at least one corresponding receiver. In another such embodiment, the signal-directing surface may be physically integrated within a signal-passing section of the envelope. In such an embodiment, the signal-directing surface may be configured to diffract signals, or components thereof, towards at least one corresponding receiver as they pass through a corresponding signal-passing section.

In embodiments where a signal-directing surface is on the surface of the balloon envelope, the signal-directing surface may be an optically-reflective surface that includes a diffraction grating configured to direct the optical signal towards at least one signal receiver. And in embodiments where a signal-directing surface is on the surface of the envelope, the signal directing surface may additionally or alternatively be a RF-reflective surface that includes a diffraction grating configured to direct the RF signal towards at least one signal receiver.

C. Illustrative Signal Receivers

With reference again to FIG. 4A, each of signal receivers 406A through 406D may generally be any suitable signal receiver, including any of those discussed above. In an embodiment any of signal receivers 406A through 406D may be an optical receiver. In an embodiment that involves optical receivers, an optical receiver may be any one of a suitable photosensor, photodetector, and/or photodiode configured to receive optical signals. Additionally, or alternatively, any of signal receivers 406A through 406D may be a RF receiver. In an embodiment that involves RF receivers, an RF receiver may be any suitable antennae configured to receive RF signals. Other examples of signal receivers may exist as well. As but one additional example, signal receivers 406A through 406D may be acoustic receivers that are configured to receive acoustic signals.

In an embodiment, the signal receiver may be a signal transmitter that is capable of both receiving and transmitting signals. Example operating configurations and characteristics of optical transmitters are described below with respect to FIGS. 7A and 7B. For illustrative purposes, example aspects of optical transmitters are discussed as well to demonstrate, for instance, how balloons within a balloon network may communicate with one another using optical signals. It should be understood, however, that this is for purposes of example and explanation only, and should not be taken to be limiting. Indeed, balloons may communicate with RF signals using similar concepts.

Figure 7A:
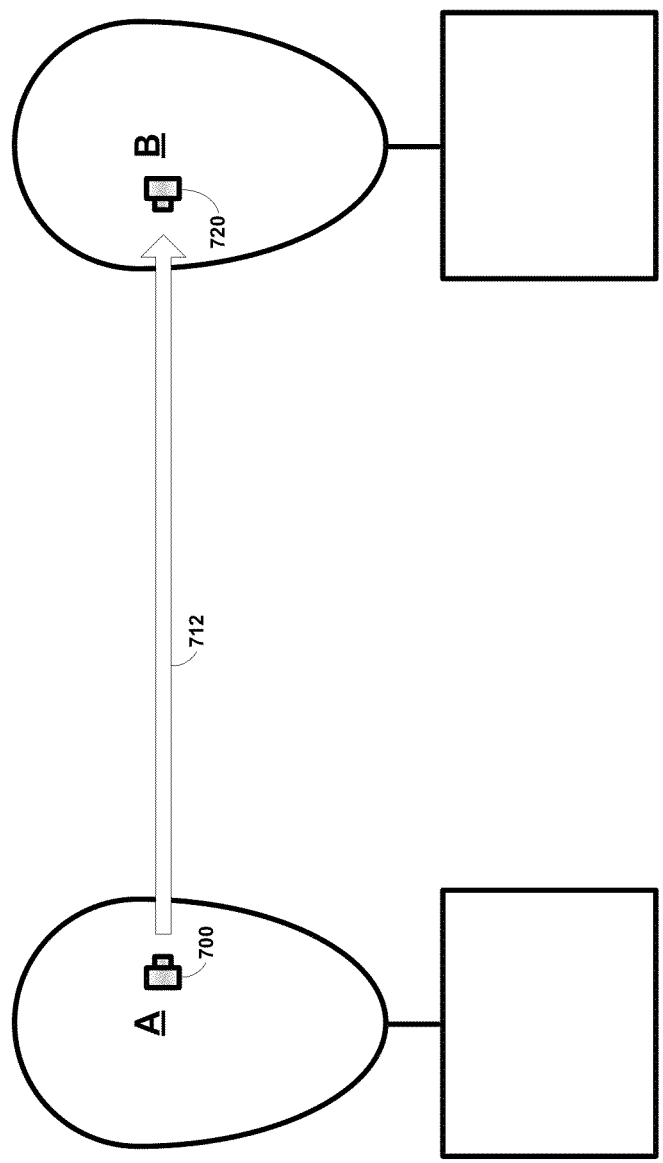
FIG. 7A is a simplified block diagram illustrating a scenario in which a balloon receives an optical signal from another balloon, according to an example embodiment.

FIG. 7A is block diagram illustrating a scenario in which a balloon A receives an optical signal from another balloon B, according to an example embodiment. Balloons A and B could each include one or more optical-communication components, such as an optical transmitter, an optical receiver, and/or an optical transceiver. Specifically, in the illustrated example, Balloon A may include an optical transmitter 700 (e.g., a transmitter employing LEDs and/or lasers) that uses beamforming to transmit an optical signal 712. Since the optical signal 712 is a beam, balloon B may be configured to substantially align its optical transmitter 720 with the optical transmitter 700 on balloon A, in order to receive and understand the optical signal 712.

Figure 7B:
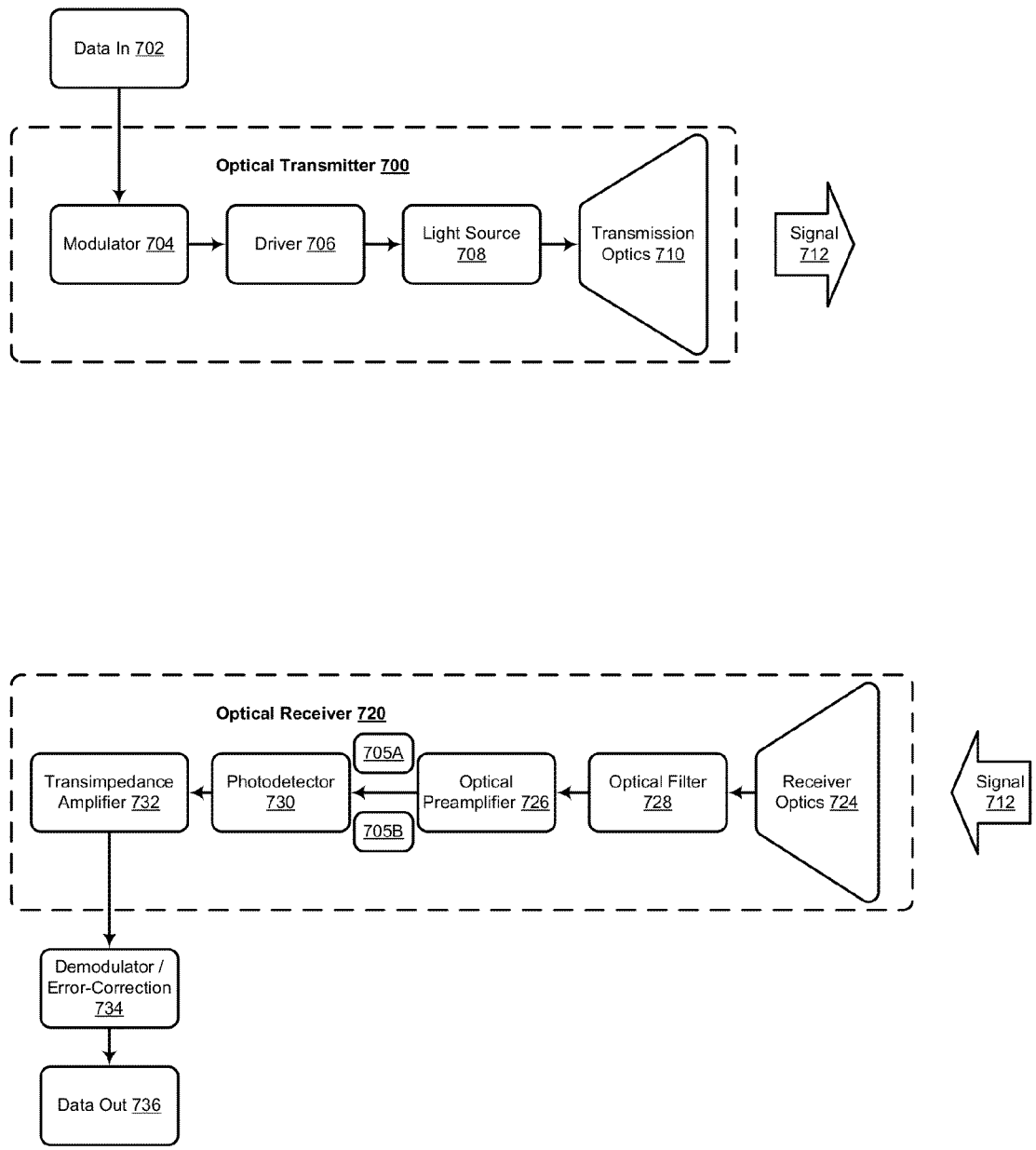
FIG. 7B is a block diagram showing a more-detailed view of the optical transmitter and the optical receiver shown in FIG. 7A, according to an illustrative configuration.

FIG. 7B is a simplified block diagram showing a more-detailed view of optical transmitter 700 and optical receiver 720, according to an illustrative configuration. In particular, the optical transmitter 720 includes receiver optics 724 that focus the optical signal onto the photodetector 730 via an optical preamplifier 726 and an optical filter 728. In an example embodiment, the optical receiver 730 may be a high-speed photodiode (e.g., that is operable to receive a gigabit signal). However, other types of photodetectors are also possible. And it is of note that various of the components shown and described with respect to FIG. 7B may be contained within, or distributed between, either a signal receiver (such as any one of signal receivers 406A through 406D) or a signal-receiver controller (such as signal-receiver controller 408).

The optical transmitter 720 also includes two photodiodes 705A and 705B, which are configured as alignment sensors. The photodiodes 705A and 705B are positioned so as to receive the optical signal at a first and a second location, respectively. In the illustrated example, the first location and the second location are proximate to opposite sides of the optical receiver 730. Thus, by comparing the amount of light detected by the photodiodes 705A and 705B, a control system of balloon B may determine how well its optical transmitter 720 is aligned with the optical transmitter 700 of balloon A. Further, when balloon B detects that optical transmitter 720 is out of alignment it may correct the alignment by e.g., changing its own position, moving the optical receiver, and/or coordinating with balloon A so that balloon A can change its position and/or move its optical transmitter. Further, in such a situation, balloon B may correct the alignment by causing the position of various signal-directing surfaces to move, as discussed further below Note that the optical transmitter 700 could receive data in 702 that could be in the form of electrical and/or optical signals. The electrical and/or optical signals that comprise the data in 702 may include information in the form of one or more digital or analog voltage and/or optical intensity level(s). The data in 702 could be received by the optical transmitter 700 via an electrical (e.g., wire or multi-conductor cable) or optical (e.g., optical fiber or waveguide) connection. Modulator 704 could encode the information from the data in 702 using one or more encoding techniques, such as intensity modulation, phase modulation, pulse-wave modulation, and/or frequency modulation. Those skilled in the art will understand that modulator 704 could reasonably use other known encoding schemes.

A driver 706 may convert the encoded information into a driving signal that could act to illuminate a light source 708. In an example embodiment, light source 708 could represent one or more light-emitting diodes (LED) or lasers. The light source 708 could also include other high-power light sources known in the art. The emission wavelengths of light source 708 could be in the ultraviolet, visible, infrared and microwave spectral regimes. The wavelength band of emission could be relatively narrow (e.g., a few nanometers in spectral width). Alternatively, the wavelength band could be broadband (e.g., a large portion of visible spectrum, as is common in 'white' LED emission). Further, light source 708 could be configured to emit light at multiple discrete wavelengths (e.g., with a two-color laser) or within multiple wavebands (e.g., with a multi-color LED).

The light source 708 could be configured to modulate (e.g., turn on and off) at high frequencies in order to achieve more than 10 gigabit-per-second (GBit/s) data throughput. Light emitted from light source 708 could be either collimated or uncollimated. Further, the intensity of the emitted light could be adjustable. The emitted light could be collimated and/or focused by transmission optics 710. The transmission optics 710 could include elements such as a telescope and/or a beam expander. Depending upon the embodiment, other optical elements could be included in the transmission optics 710, such as those known in the art that may be used for long-range imaging.

In an alternative embodiment, light emitted from the light source 708 could be modulated by a modulator. For instance, a polarization modulator could be configured to modulate the polarization of the light emitted from light source 708. In such a scenario, the free-space optical signal could include data based, at least in part, on the polarization of light. Various modulator types are possible, including a liquid-crystal modulator and a spatial light modulator, among others. In practice, the free-space optical signal could include more than one type of light modulation. Further, the light modulation could be performed at high frequencies to achieve more than 10 GBit/s data transmission.

Depending upon the embodiment, the elements of the transmission optics 710 could be configured in different ways in an effort to efficiently transmit output light as a free-space optical signal, such as signal 712, to a correspondent balloon. For instance, the transmission optics 710 could be configured to provide an optical-communications link over several kilometers. In other embodiments, the transmission optics 710 could be configured differently in order to establish an optical-communications link with a ground-based station or a space-based platform. For instance, the configuration of optical components in the transmission optics 710 could be different if the intended target was a ground-based station (15-30 km away) compared to if the intended target was a space-based platform (geosynchronous orbits can be over 42,000 km). Therefore, the distance between the balloon and a space-based target could be over 42,000 km away. Accordingly, the optical components in the transmission optics 710 could be adjusted (e.g., by using a zoom and/or focusing feature on the telescope). In other embodiments, separate sets of transmission optics 710 could be used based upon, for instance, the intended target distance and target altitude.

An optical receiver 720 could be configured to receive a signal 712 that could represent part of an optical-communications link. The signal 712 could be a free-space optical signal with encoded information from a correspondent balloon or another airborne platform. The signal 712 could also originate from a ground-based station or a space-based platform (e.g., a satellite or other space-craft).

Signal 712 could be optically collected by receiver optics 724. Receiver optics 724 could include a telescope or any combination of optics (such as refractive lenses and reflective mirrors) known in the art for receiving free-space optical signals at long distances (e.g., more than several kilometers). Light received by the receiver optics 724 could be amplified using an optical preamplifier 726. The optical preamplifier 726 could include one or more of a doped fiber amplifier, semiconductor optical amplifier (SOA), Raman amplifier, and/or a parametric amplifier. Other optical amplifier types are possible within the context of this disclosure.

The optical signal could be filtered by an optical filter 728. In some embodiments, the optical filter could include an absorptive filter, an interference filter, and/or a dichroic filter. The optical signal could be filtered in various ways, for instance based upon wavelength (e.g., in a bandpass filter) and/or polarization (e.g., with a polarizer or waveplate).

The filtered light could be detected by a photodetector 730. The photodetector 630 could include one or more photodiodes, charge-coupled devices (CCD), photoconductors, or other means for photon-sensing known in the art. The photodetector 730 could include a multiple element detector system configured to detect changes in an optical beam location. In an example embodiment, the photodetector could transduce incident light into a photocurrent signal. The photocurrent signal could then be amplified with a transimpedance amplifier 732. The transimpedance amplifier 732 may be configured to convert the photocurrent signal into a voltage and provide signal gain. Other amplifier types are possible, and could be dependent, for instance, upon the output type of the photodetector. For instance, if the photodetector 730 is a photoconductive device that produces a photovoltage, a tranconductance amplifier could be used to convert the photovoltage to a signal current. Those skilled in the art will understand that there are many other ways to convert a photosignal into an electrical signal, and those other ways are contemplated herein.

The optical receiver could also include a demodulator/error-correction element 734, which may be configured to extract information from the signal 712. The type of demodulation utilized by the demodulator/error-correction element 734 may depend upon the type of modulation initially performed on the optical signal. For instance, the demodulation method may include carrier recovery, clock recovery, frame synchronization, pulse compression, error detection and correction, and/or mixing with a local oscillator (e.g., heterodyne detection). Other demodulation methods known in the field of optical and digital signal processing are possible.

The demodulator/error-correction element 734 could be further configured to detect and correct errors in the as-received signal. For instance, the element 734 could include a hash function, a checksum algorithm, and/or other redundancy check algorithms in an effort to reduce data transmission errors. Further, error-correcting codes (ECCs) (e.g., Turbo or low-density parity-check codes) could be implemented in the demodulator/error-correction element 734 to detect and correct errors. If errors are found, the optical receiver 720 could be configured to correct the error automatically with a forward error correction (FEC) algorithm. Alternatively, the optical receiver 720 could be configured to send an automatic repeat request (ARQ) to the transmitting node via a reverse channel in an effort to get a new transmission of the data.

In reference to FIG. 3, the optical-communication component(s) 330, such as optical transmitter 700 and/or optical receiver 720, could be mechanically coupled to a gimbal mount 328. The gimbal mount 328 could be configured to adjustably point in a pointing direction 332. Second optical-communication component(s) 336 could be mechanically coupled to a gimbal mount 334 and oriented along a pointing direction 338. The second optical-communication component(s) 336 could represent multiple components configured to maintain optical communication links with multiple nodes and/or nodes at varying altitudes. For instance, optical-communication component 330 could be configured to maintain an optical link with a neighbouring balloon while optical-communication component 336 could be configured to maintain an optical link with a ground-based station. In other words, one or more optical-communication components could be used with respective pointing mechanisms in an effort to maintain optical links with one or more ground-, air-, or space-based network nodes. As a general matter, the signal-directing surfaces described herein, as well as the other signal-directing components and functions described herein, may be used in an effort to maintain optical links with one or more ground-, air-, or space-based network nodes. Within the context of this disclosure, the optical-communication components 330 and 336 may include an optical transmitter, an optical receiver, and/or an optical transceiver.

In an embodiment, a balloon may include receivers of multiple types. For instance, a balloon may include both optical receivers and RF receivers, among other types of receivers. Accordingly, a given signal-passing section of an envelope may correspond to both an optical receiver and an RF receiver.

Figure 8:
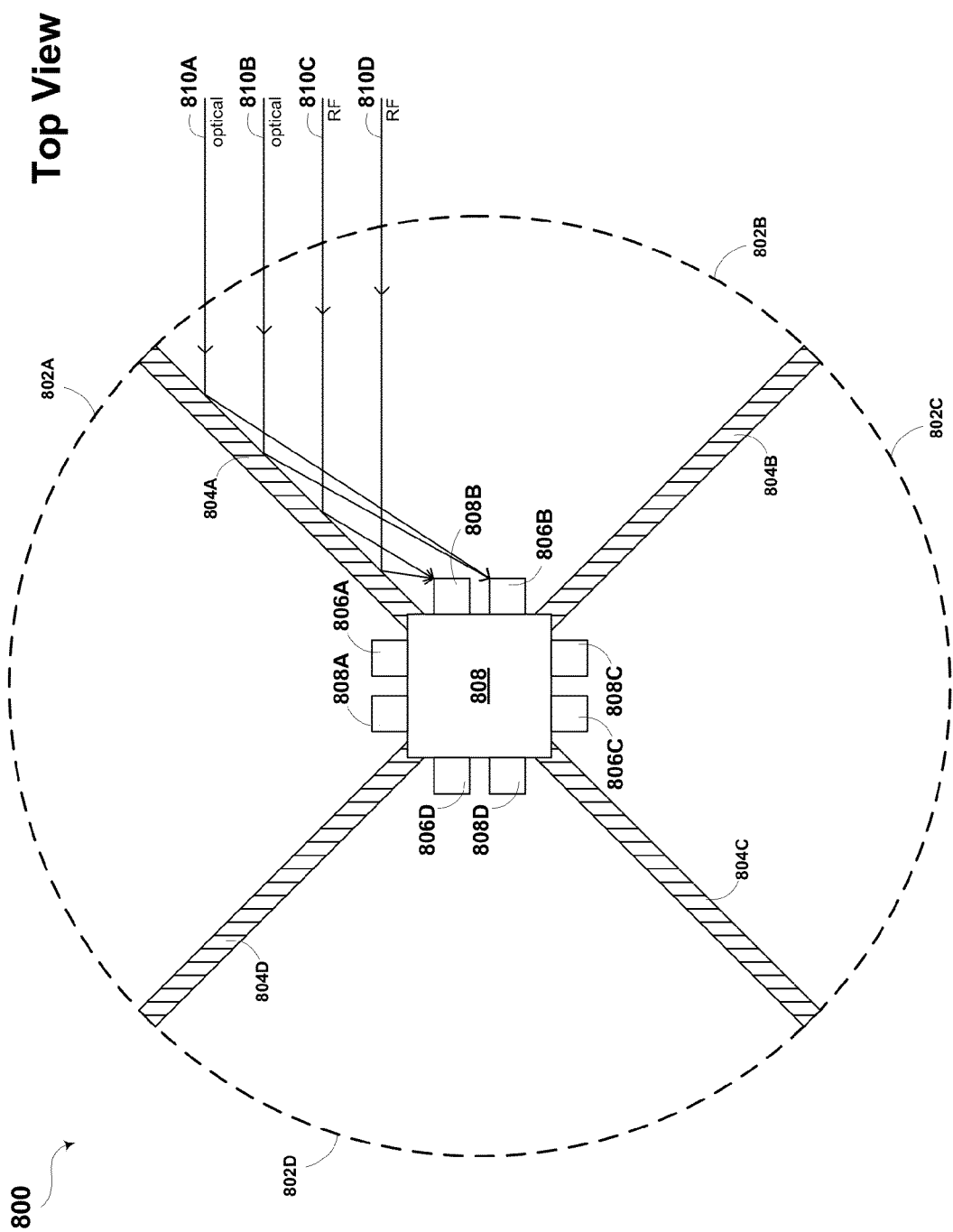
FIG. 8 is a simplified illustration of a second example balloon envelope with integrated receivers.

FIG. 8 shows a simplified block diagram of an example balloon with integrated signal receivers, including both optical receivers and RF receivers. As shown, the example balloon includes an envelope 800 that includes signal-passing sections 802A through 802D, signal directing surfaces 804A through 804D, and signal receivers 806A through 806D and 808A through 808D. Also shown in FIG. 8 is signal-receiver controller 808 that may be used to control signal receivers 806A through 806D and 808A through 808D and/or analyse or otherwise process signals received by signal receivers 806A through 806D and 808A through 808D. For purposes of examples and explanation, signal receivers 806A through 806D represent optical receivers and signal receivers 808A through 808D represent RF receivers.

As shown, each signal-passing section generally corresponds to two signal receivers, an optical receiver and an RF receiver. For instance, signal-passing section 802A corresponds to optical receiver 806A and RF receiver 808A, signal-passing section 802B corresponds to optical receiver 806B and RF receiver 808B, signal-passing section 802C corresponds to optical receiver 806C and RF receiver 808C, and signal-passing section 802D corresponds to optical receiver 806D and RF receiver 808D.

Further, like the example set forth with respect to FIG. 4A, each signal-passing section generally corresponds to at least one signal-directing surface. For instance, signal-passing section 802A corresponds to signal-directing surfaces 804A and 804D, signal-passing section 802B corresponds to signal-directing surfaces 804A and 804B, signal-passing section 802C corresponds to signal-directing surfaces 804B and 804C, and signal-passing section 802D corresponds to signal-directing surfaces 804C and 804D.

Each of signals 810A through 810D are shown as passing through signal-passing section 802B and incident on signal-directing surface 804A, where signal-directing surface 804A corresponds to signal-passing section 802B and is located within the envelope 800 of the example balloon. For purposes of example and explanation, signals 810A and 810B represent optical signals, while signals 810C and 810D represent RF signals.

Each of optical receiver 806B and RF receiver 808B corresponds to signal-passing section 802B. And, upon reflection off of signal-directing surface 404B, each of signals 412A through 412C are directed towards one or both of optical receiver 806B and RF receiver 808B. For purposes of example and explanation, each of optical signals 810A and 810B are shown as being directed toward optical receiver 806B by signal-directing surface 804A. And each of RF signals 810C and 810D are shown as being directed toward RF receiver 808B.

As described above, a signal-directing surface may include a diffraction grating that is configured to direct signals of a first frequency at a first angle, and direct signals of a second frequency at a second angle. Accordingly, signal-directing surface 804A may include a diffraction grating that is configured to direct optical signals 810A and 810B at a first angle (i.e., at an angle towards optical receiver 806B), and the diffraction grating may also be configured to direct RF signals 810C and 810D at a second angle (i.e., at an angle towards RF receiver 808B).

Additional receiver arrangements, including receiver arrangements that involve multiple types of receivers, are discussed further below with respect to FIGS. 9 and 10.

And it should be understood that the particular arrangement of receivers and signal-directing surfaces, as well as the corresponding transmission path of signals, are set forth above in FIGS. 8 and 4A for purposes of example and explanation only. Though example signal paths are depicted, it should be understood that such depictions do not necessarily correspond to actual, required, or even realistic signal paths. Rather such signal paths are set depicted to aid the explanation of various concepts described herein. Such depictions should not be taken to be limiting.

D. Illustrative Communication Chambers and Sensor Configurations

Various signal-passing surfaces and signal-directing surfaces may form an interior volume that may be referred to, for purposes of example and explanation, as a communication chamber. With reference to FIG. 4A, for instance, example balloon 400 is shown as including communication chambers 414A through 414D. Communication chamber 414A is defined by signal-passing section 402A, signal-directing surface 404A, and signal-directing surface 404D, and includes signal receiver 406A. Communication chamber 414B is defined by signal-passing section 402B, signal-directing surface 404A, and signal-directing surface 404B, and includes signal receiver 406B. Communication chamber 414C is defined by signal-passing section 402C, signal-directing surface 404B, and signal-directing surface 404C, and includes signal receiver 406C. And communication chamber 414D is defined by signal-passing section 404C, signal-directing surface 404C, and signal-directing surface 404D, and includes signal receiver 402D.

Figure 9:
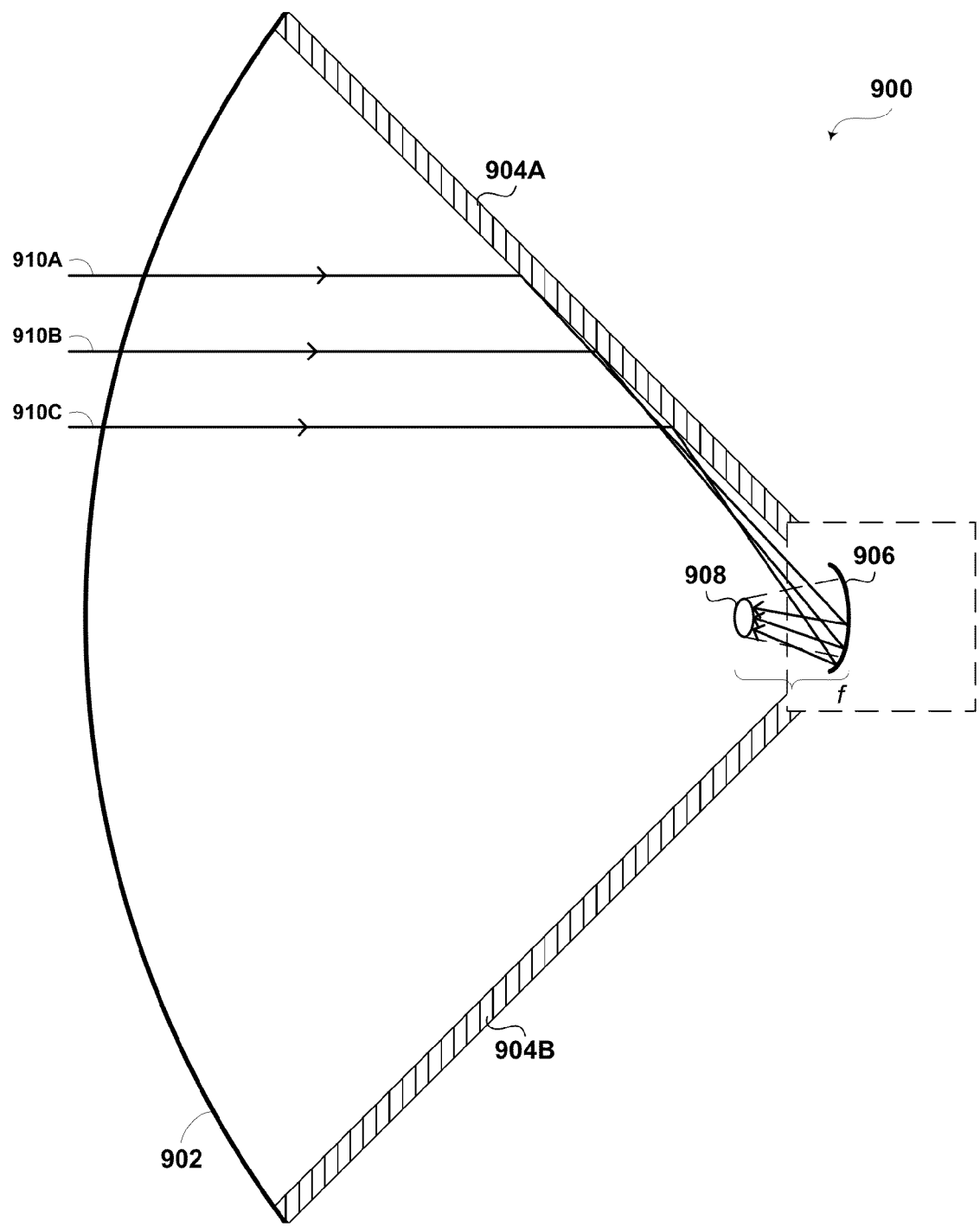
FIG. 9 is a simplified illustration of an example chamber of a balloon.

FIG. 9 is a simplified illustration of an example chamber 900 of a balloon. As shown, example chamber 900 includes signal-passing section 902, signal-directing surfaces 904A and 904B, signal-directing surface 906, and signal receiver 908. Example chamber 900, and various components thereof, may be arranged to direct and ultimately receive signals 910A through 910C.

Signal-directing surfaces 904A and 904B may be similar to any of those signal-directing surfaces described above with respect to FIGS. 4A, 6A-6E, and 8. Signal-directing surface 906 may be configured to direct signals towards signal receiver 908, where the signal has previously been reflected off of at least one of signal-directing surface 904A and/or 904B. Correspondingly, each of signal-directing surfaces 904A and 904B may be configured to direct signals toward signal-directing surface 906.

Signal-directing surface 906 may be configured in any suitable manner. In an embodiment, signal-directing surface 906 may be configured to direct optical and/or RF signals. Additionally and/or alternatively, signal-directing surface 906 may include a diffraction grating. Such a diffraction grating may take the form of any of those diffraction gratings described above with respect to FIGS. 6A-6E. Signal-directing surface 906 may be substantially flat, or may be, for instance, concave. In an embodiment where signal-directing surface 906 is concave, signal-directing surface 906 may be configured to have a focal length f that is equal to the distance of signal receiver 908 from signal-directing surface 906.

Figure 10:
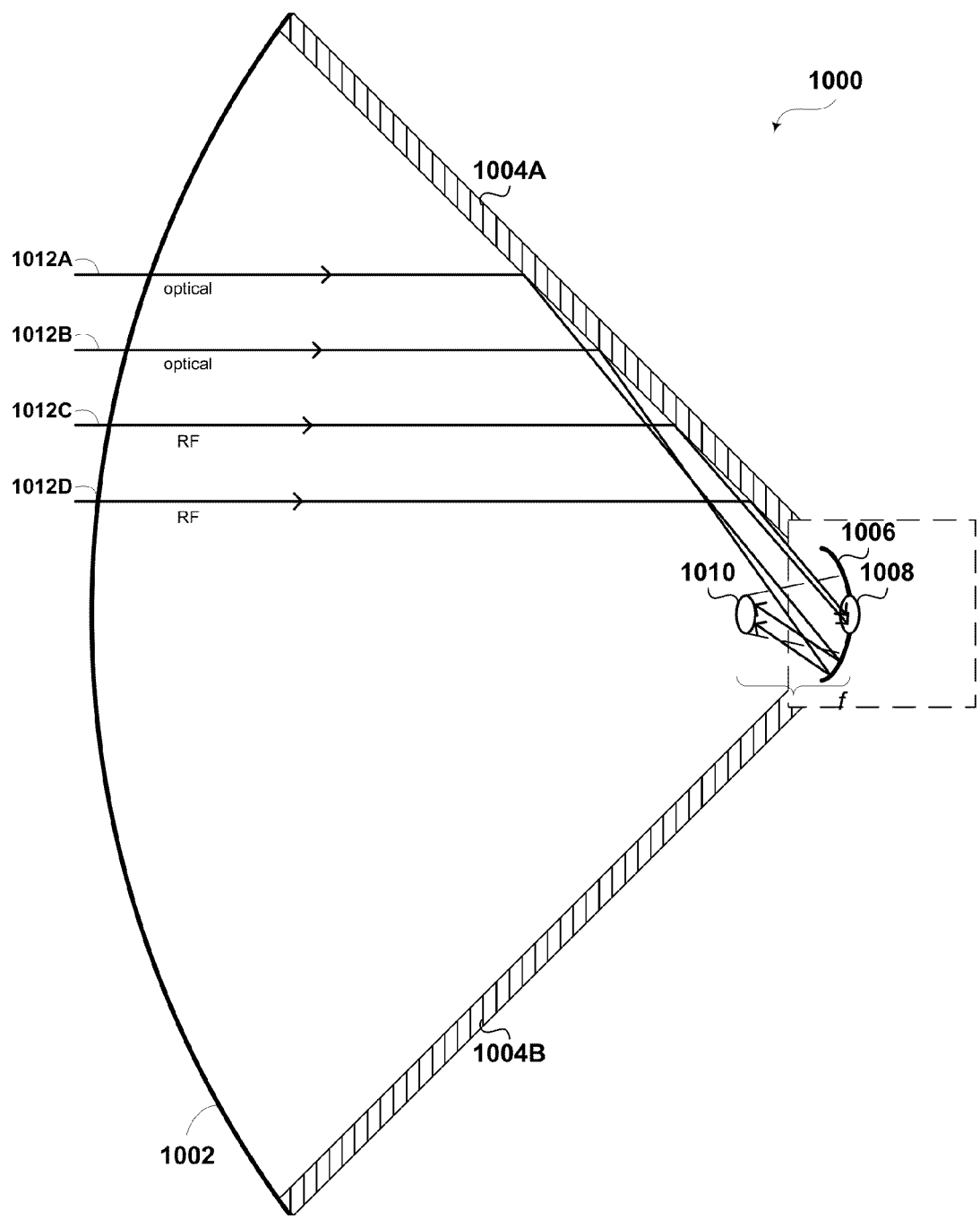
FIG. 10 is a simplified illustration of a second example chamber of a balloon.

FIG. 10 is a simplified illustration of a second example chamber 1000 of a balloon. As shown, example chamber 1000 includes signal-passing section 1002, signal-directing surfaces 1004A and 1004B, signal-directing surface 1006, signal-receiver 1008, and signal-receiver 1010. In an embodiment, signal-receiver 1008 may be an RF receiver and signal-receiver 1010 may be an optical receiver, though this is not necessary.

Each of signals 1012A through 1012D are shown as passing through signal-passing section 1002 and incident on signal-directing surface 1004A, where signal-directing surface 1004A corresponds to signal-passing section 1002 and is located within envelope 1000 of the example balloon. For purposes of example and explanation, signals 1012A and 1012B represent optical signals, while signals 1012C and 1012D represent RF signals.

Signal-directing surfaces 1004A and 1004B may be similar to any of those signal-directing surfaces described above with respect to FIGS. 4A, 6A-6E, and 8. Signal-directing surface 1006 may be configured to direct signals towards signal receiver 1010, where the signal has previously been reflected off of at least one of signal-directing surface 1004A and/or 1004B. Correspondingly, each of signal-directing surfaces 1004A and 1004B may be configured to direct signals toward signal-directing surface 1006.

According to the example shown in FIG. 10, for instance, signal-directing surface 1004A may be configured to direct optical signals 1012A and 1012B towards signal-directing surface 1006. In turn, signal-directing surface 1006 may be configured to direct optical signals 1012A and 1012B towards signal receiver 1010.

Signal-directing surface 1006 may be configured in any suitable manner. In an embodiment, signal-directing surface 1006 may be configured to direct optical and/or RF signals. Additionally and/or alternatively, signal-directing surface 1006 may include a diffraction grating. Such a diffraction grating may take the form of any of those diffraction gratings described above with respect to FIGS. 6A-6E. Signal-directing surface 1006 may be substantially flat, or may be, for instance, concave. In an embodiment where signal-directing surface 1006 is concave, signal-directing surface 1006 may be configured to have a focal length f that is equal to the distance of signal receiver 1010 from signal-directing surface 1006.

As noted, signal receiver 1008 may be an RF receiver. Correspondingly, signal-directing surface 1004A may be configured to direct RF signals 1012C and 1012D towards signal receiver 1008. In an embodiment, signal receiver 1008 may be physically integrated into signal-directing surface 1008. In an alternative embodiment, signal receiver 1008 may be placed in the transmission path of signals 1012C and 1012D before signal-directing surface 1006. In another alternative embodiment, signal receiver 1008 may be placed in the transmission path of signals 1012C and 1012D after signal-directing surface 1006, where signal-directing surface 1006 is configured to pass signals such as signals 1012C and 1012D. In such an embodiment, signal-directing surface 1006 may be configured to pass RF signals.

E. Illustrative Separation Chambers

Figure 11A:
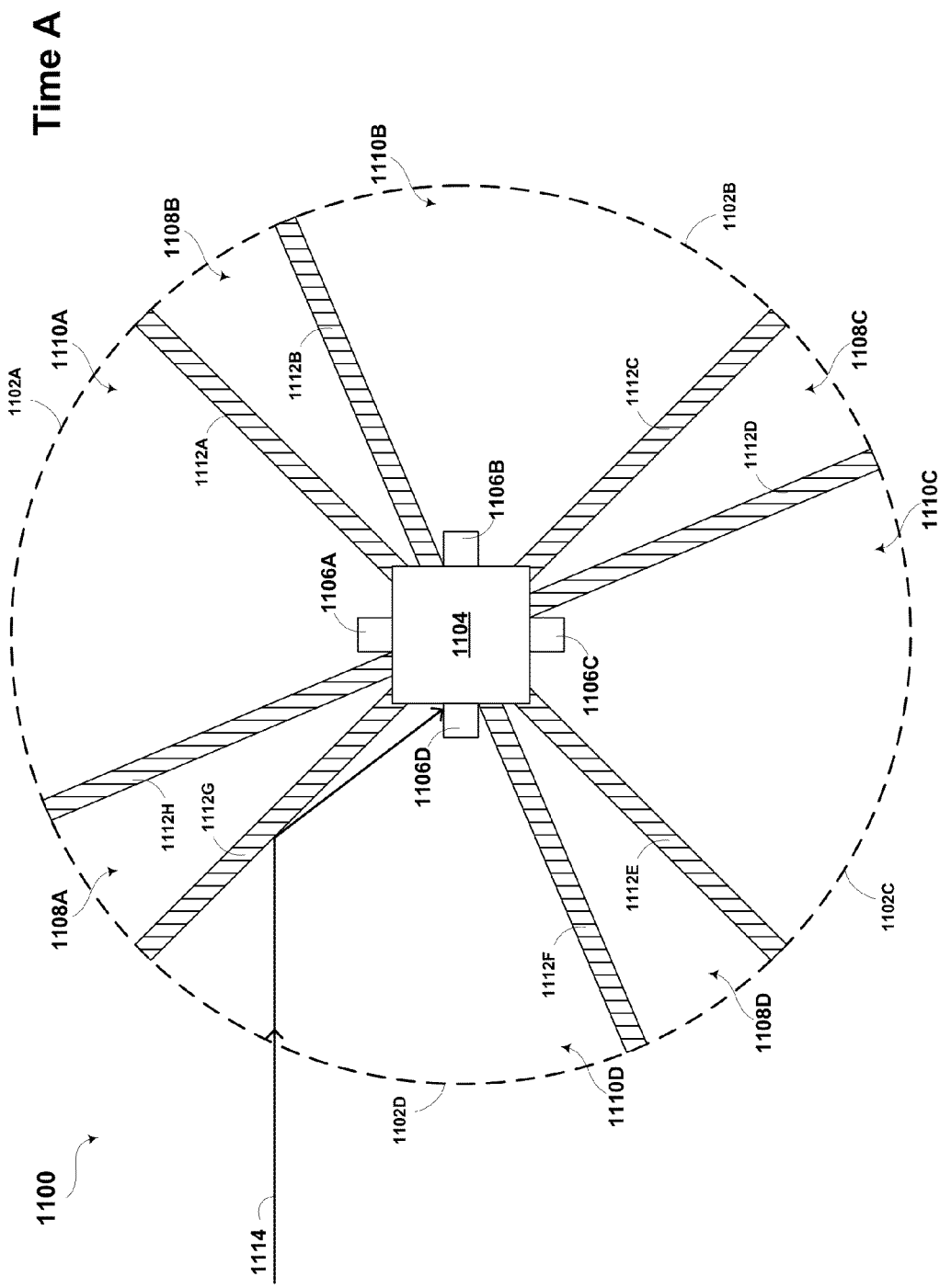
FIGS. 11A through 11B are simplified illustrations of a third example balloon envelope with integrated receivers.

Now with reference to FIG. 11A, example balloon 1100 is shown as including communication chambers 1110A through 1110D. Communication chamber 1110A is defined by signal-passing section 1102A, signal-directing surface 1112A, and signal-directing surface 1112H, and includes signal receiver 1106A. Communication chamber 1110B is defined by signal-passing section 1102B, signal-directing surface 1112B, and signal-directing surface 1112C, and includes signal receiver 1106B. Communication chamber 1110C is defined by signal-passing section 1102C, signal-directing surface 1112D, and signal-directing surface 1112E, and includes signal receiver 1106C. And communication chamber 1110D is defined by signal-passing section 1102D, signal-directing surface 1112F, and signal-directing surface 1112G, and includes signal receiver 1106D.

Thus each communication chamber includes a respective signal-passing section, at least one signal-directing surface, and at least one signal receiver corresponding to the signal-passing section of the chamber.

As shown, example balloon 1100 also includes separation chambers 1108A through 1108D. Separation chamber 1108A is defined by the envelope of balloon 1100, signal-directing surface 1112H and signal-directing surface 1112G. Separation chamber 1108B is defined by the envelope of balloon 1100, signal-directing surface 1112A and signal-directing surface 1112B. Separation chamber 1108C is defined by the envelope of balloon 1100, signal-directing surface 1112C and signal-directing surface 1112D. And separation chamber 1108D is defined by the envelope of balloon 1100, signal-directing surface 1112E and signal-directing surface 1112F.

Each separation chamber is situated between two respective communication chambers such that each separation chamber separates the two respective communication chambers. For instance, separation chamber 1108A is situated between communication chamber 1110A and communication chamber 1110D such that separation chamber 1108A separates communication chamber 1110A and communication chamber 1110D. Separation chamber 1108B is situated between communication chamber 1110A and communication chamber 1110B such that separation chamber 1108B separates communication chamber 1110A and communication chamber 1110B. Separation chamber 1108C is situated between communication chamber 1110B and communication chamber 1110C such that separation chamber 1108C separates communication chamber 1110B and communication chamber 1110C. And separation chamber 1108D is situated between communication chamber 1110C and communication chamber 1110D such that separation chamber 1108D separates communication chamber 1110C and communication chamber 1110D.

In an embodiment, one or more of separation chambers 1108A through 1108D may be configured such that a size of the one or more separation chambers is adjustable. For instance, one or more of the signal-directing surfaces that define a given separation chamber may be movable such that the size of the given separation chamber is adjustable.

For purposes of example and explanation, consider that example balloon 1100 contains separation chambers 1108A through 1108D of the respective sizes shown in FIG. 11A at a given Time A. Now, with reference to FIG. 11B, consider that example balloon 1100 contains separation chambers 1108A through 1108D of the respective sizes shown in FIG. 11B at Time B (where Time B is different from Time A). As shown, at Time B, signal-directing surfaces 1112C and 1112G have moved from their respective positions at Time A. For convenience, surface outline 1114C depicts the position of signal-directing surface 1112C at Time A and surface outline 1114G depicts the position of signal-directing surface 1112G at Time A.

In an embodiment, a given separation chamber may be configured such that the size of the separation chamber may be increased by receiving gas into the given separation chamber from at least one of the two communication chambers that the given separation chamber separates. For example, separation chamber 1108C may be configured to receive gas from communication chamber 1110B. As a result of receiving gas from a communication chamber, separation chamber 1108C may contain more gas at Time B than it does at Time A. And signal-directing surface 1112C may be flexibly affixed within balloon 1100 such that, as a result of gas entering separation chamber 1108C, signal-directing surface 1112C moves from the position depicted at Time A to the position depicted at Time B.

In an embodiment, gas may be communicated between separation chamber 1108C and communication chamber 1110B by way of a pump and/or valve contained within signal-directing surface 1112C. In another embodiment, gas may be communicated between separation chamber 1108C and communication chamber 1110B by way of a common gas reservoir that is configured to receive gas from communication chamber 1110B and transmit gas to separation chamber 1108C. Other examples of manners of communicating gas between chambers may exist as well.

Similarly, a given separation chamber may be configured such that the size of the separation chamber may be decreased by transmitting gas from the given separation chamber to at least one of the two communication chambers that the given separation chamber separates. In such an embodiment, gas may be communicated by way of a pump, valve, and/or common gas reservoir such as that described above.

As will be described further below, as a result of adjusting the size of the chambers within the balloon (and the corresponding adjustment of the position of the signal-directing surfaces), the direction in which signals are directed by the signal-directing surfaces may be adjusted. Thus, the size of the chambers may be adjusted so as to configure or otherwise arrange the signal-directing surfaces so that they direct signals toward desired signal receivers.

V. ILLUSTRATIVE METHODS

Figure 11B:
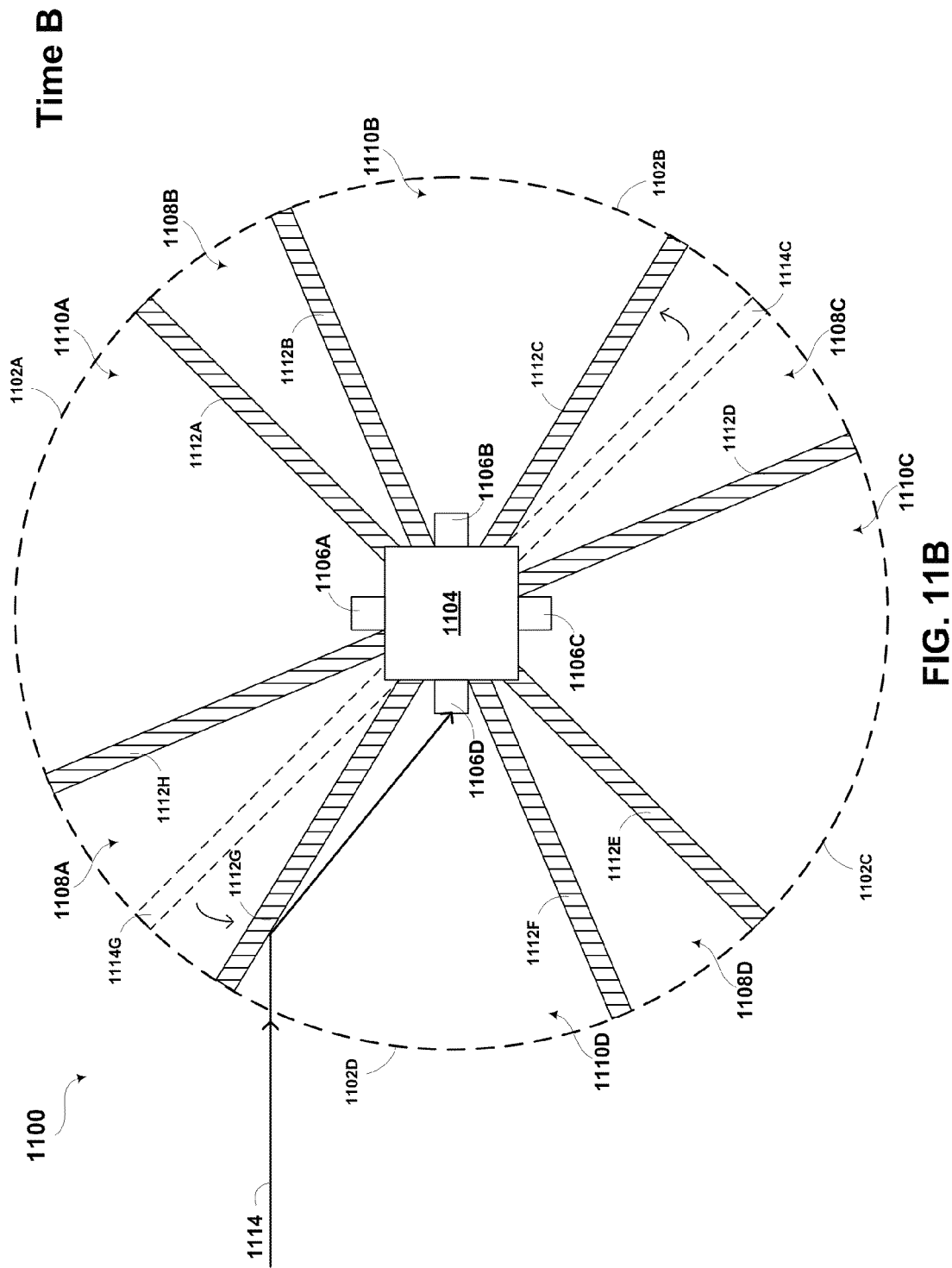
Figure 12:
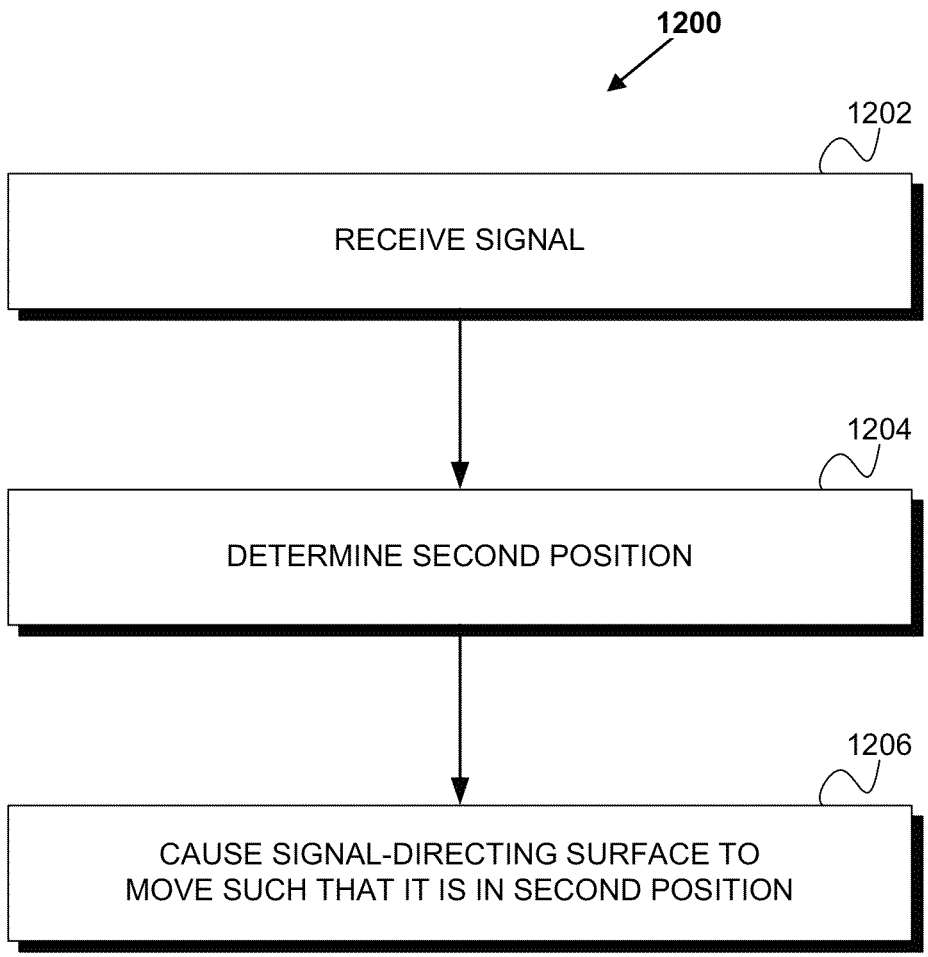
FIG. 12 is a flow chart illustrating a computer-implemented method, according to an example embodiment.

FIG. 12 is a flow chart illustrating a computer-implemented method, according to an example embodiment. Example methods, such as method 1200 of FIG. 12, may be carried out by a balloon, and in particular, by one or more components of a balloon, such as a control system and/or other components. A control system may take the form of program instructions stored on a non-transitory computer readable medium (e.g., memory 314 of FIG. 3) and a processor that executes the instructions (e.g., processor 312). However, a control system may take other forms including software, hardware, and/or firmware. Further, a balloon that implements an example method, such as method 1200, may include components such as those shown in FIGS. 3 through 11.

More specifically, as shown by block 1202, method 1200 involves a balloon control system receiving a signal at the balloon, where the balloon includes an envelope including a plurality of sections including one or more signal-passing sections, at least one signal-directing surface, where the one or more signal-directing surfaces include one or more signal-directing surfaces corresponding to each signal-passing section, and where the one or more signal-directing surfaces are located inside of the envelope at a first position, and at least one signal receiver corresponding to each signal-passing section, where each signal-passing section is configured to allow a signal to pass to the one or more corresponding signal-directing surfaces, and where each signal-directing surface is configured to direct the optical signal towards the at least one corresponding receiver. Further, the control system, based on the received first signal, determines a second position that is different from the first position, as shown by block 1204. The control system then causes the at least one signal-directing surface to move such that it is in the second position, as shown by block 1206.

A. Receive Signal

At block 1202, method 1200 involves a balloon control system receiving a signal at the balloon. In an embodiment, the balloon includes an envelope that includes a plurality of sections including one or more signal-passing sections. The envelope also includes at least one signal-directing surface, where the one or more signal-directing surfaces include one or more signal-directing surfaces corresponding to each signal-passing section, and where the one or more signal-directing surfaces are located inside of the envelope at a first position. And the envelope also includes at least one signal receiver corresponding to each signal-passing section, where each signal-passing section is configured to allow a signal to pass to the one or more corresponding signal-directing surfaces, and where each signal-directing surface is configured to direct the optical signal towards the at least one corresponding receiver.

The balloon, for example, may take the form of any of those balloons described above with respect to FIGS. 3 through 11. For instance, with reference to FIG. 111A, the balloon that carries out method 1200 may include envelope 1100 that includes a plurality of sections including signal-passing sections 1102A through 1102D. Envelope 1100 also includes signal-directing surfaces 1112A through 1112G, where signal-directing surface 1112G corresponds to signal-passing section 1102D, and where signal-directing surface 1112G is located inside of envelope 1100 at a first position. And envelope 1100 also includes signal receiver 1106D corresponds to signal-passing section 1102D, where signal-passing section 1102D is configured to allow signal 1114 to pass to signal-directing surface 1112G, and where signal-directing surface 1112G is configured to direct signal 1114 towards signal receiver 1106D.

In accordance with block 1202, the balloon control system may receive signal 1114 via a corresponding signal receiver. For instance, signal 1114 may be received by signal receiver 1106D as it is directed by signal-directing surface 112G.

B. Determine Second Position

At block 1204, the control system, based on the received first signal, determines a second position of the signal-directing surface that is different from the first position of the signal-directing surface.

For instance, in accordance with block 1204, the control system may be configured to determine, or otherwise recognize, that signal 1114 is not being directed by signal-directing service 1112G towards signal receiver 1106D at an angle that maximizes that amount of signal 1114 that is received by signal receiver 1106D. For illustrative purposes, in FIG. 11A signal 1114 is shown as being directed by signal-directing surface 1112G towards signal-receiver 1106D, but signal 1114 is not "centered" on signal receiver 1106D. This suggests that the amount of signal 1114 that is ultimately received by signal receiver 1106D may be increased by changing the position of signal-directing surface 1112G.

Accordingly, block 1204 may involve the control system determining a maximum-signal position of signal-directing surface 1112G that maximizes the amount of signal 1114 directed towards the signal receiver 1106. The control system may then select as the second position the determined maximum-signal position. For purposes of example and explanation, the second position may by the position of signal-directing surface 1112G shown in FIG. 11B. Note that, as shown in FIG. 11B, signal 1114 is "centered" on signal receiver 1106D, suggesting that signal receiver 1106D is receiving more of signal 1114 at Time B when signal-directing surface 1112G is in the second position than it did at Time A when signal-directing surface 112G was in the first position.

In an embodiment, the second position of signal-directing surface 1112G may be determined by "scanning" signal-directing surface 1112G through a range of positions, and identifying which position from the range of position results in signal receiver 1106D receiving the most of signal 1114. Alternatively, the second position may be predicted and/or inferred based on where upon the sensing surface of signal receiver 1106D signal 1114 is received when signal-directing surface 1112G is in the first position. Other approaches to determining the second position may exist as well.

C. Cause Signal-Directing Surface to Move Such that it is in Second Position

At block 1206, the control system causes the at least one signal-directing surface to move such that it is in the second position. Accordingly, block 1206 may involve the control system causing signal-directing surface 1114 to move to the position depicted in FIG. 11B. Signal-directing surface 1114 may be moved using any of those techniques discussed above. For instance, signal-directing surface 1114 may be moved by causing the size of separation chamber 1108A to increase by receiving gas into separation chamber 1108A from communication chamber 1110D. Alternatively, signal-directing surface 1114 may be moved by causing the size of separation chamber 1108A to decrease by transmitting gas from separation chamber 1108A to communication chamber 1110D.

The control system may cause the signal-directing surface to move in other suitable manners as well, including any of those discussed above with respect to FIGS. 11A and 11B.

VI. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A balloon, comprising:
    an envelope comprising one or more signal-passing sections, each of the one or more signal-passing sections being configured to allow a signal to pass through;
    at least one signal receiver corresponding to a particular one of the one or more signal-passing sections; and
    at least one signal-directing surface located within the envelope and corresponding to the particular one of the one or more signal-passing sections, the at least one signal-directing surface being configured to receive the signal and direct the signal towards the at least one signal receiver, and the at least one signal-directing surface extends inwardly from an inner surface of the envelope towards an interior of the envelope.

2. The balloon of claim 1, wherein each of the one or more signal-passing sections is of substantially the same surface area.

3. The balloon of claim 1, wherein the one or more signal-passing sections includes four signal-passing sections.

4. The balloon of claim 1, wherein the one or more signal-passing sections is at least partially made of a material that is at least partially translucent.

5. The balloon of claim 1, wherein the at least one signal receiver includes one or more of an optical receiver and a radio-frequency (RF) receiver.

6. The balloon of claim 1, wherein the signal is an optical signal, and wherein the at least one signal-directing surface is an optically-reflective surface.

7. The balloon of claim 6, wherein the at least one signal-directing surface comprises a diffraction grating configured to direct the optical signal towards the at least one signal receiver.

8. The balloon of claim 7, wherein the optical signal is of a given wavelength, and wherein diffraction grating is also configured to reflect light of wavelengths other than the given wavelength away from the at least one signal receiver.

9. The balloon of claim 1, wherein the signal is a radio-frequency (RF) signal, and wherein the at least one signal-directing surface is an RF-reflective surface.

10. The balloon of claim 9, wherein the at least one RF-reflective surface includes a diffraction grating configured to direct the RF signal towards the at least one signal receiver.

11. The balloon of claim 1, wherein each signal-passing section of the one or more signal-passing sections corresponds to (i) at least one optical receiver, (ii) at least one signal-directing surface that is an optically-reflective surface, wherein the at least one optically-reflective surface includes a diffraction grating configured to direct an optical signal towards the at least one optical receiver, (iii) at least one radio-frequency (RF) receiver, and (iv) at least one signal-directing surface that is an RF-reflective surface, wherein the at least one RF-reflective surface includes a diffraction grating configured to direct an RF signal towards the at least one RF receiver.

12. The balloon of claim 1, further comprising:
at least two communication chambers, each communication chamber comprising a respective signal-passing section, at least one signal-directing surface, and at least one signal receiver corresponding to the signal-passing section of the communication chamber; and at least one separation chamber, wherein each separation chamber is situated between the two respective communication chambers such that each separation chamber separates the two respective communication chambers.

13. The balloon of claim 12, wherein the at least one separation chamber is configured such that a size of the one or more separation chambers is adjustable.

14. The balloon of claim 13, wherein the one or more separation chambers is configured such that (i) the size of the at least one separation chamber may be increased by receiving gas into the at least one separation chamber from at least one of the two respective communication chambers and (ii) the size of the at least one separation chamber may be decreased by transmitting gas from the at least one separation chamber to at least one of the two respective communication chambers.

15. The balloon of claim 1, further comprising a computing system communicatively coupled to the at least one signal receiver.

16. A computer-implemented method, comprising:
receiving a signal at a balloon, wherein the balloon comprises:
an envelope comprising one or more signal-passing sections, each of the one or more signal-passing sections being configured to allow a signal to pass through;
at least one signal receiver corresponding to a particular one of the one or more signal-passing sections; and
at least one signal-directing surface located within the envelope and corresponding to the particular one of the one or more signal-passing sections, the at least one signal-directing surface being configured to receive the signal and direct the signal towards the at least one signal receiver, and the at least one signal-directing surface extends inwardly from an inner surface of the envelope towards an interior of the envelope; and
based on the received signal, determining a second position of the signal-directing surface that is different from a first position of the signal-directing surface; and
causing the at least one signal-directing surface to move from the first position to the second position.

17. The computer-implemented method of claim 16, wherein determining the second position comprises:
determining a maximum-signal position that maximizes the amount of the signal directed towards the at least one sensor; and
selecting as the second position the determined maximum-signal position.

18. The computer-implemented method of claim 16, wherein the balloon further comprises:
at least two communication chambers, each communication chamber comprising a respective signal-passing section, at least one signal-directing surface, and at least one signal receiver corresponding to the signal-passing section of the communication chamber; and
at least one separation chamber, wherein each separation chamber is situated between the two respective communication chambers such that each separation chamber separates the two respective communication chambers.

19. The computer-implemented method of claim 18, wherein causing the at least one signal-directing surface to move such that it is in the second position comprises at least one of (i) causing the size of the at least one separation chamber to increase by receiving gas into the at least one separation chamber from at least one of the two respective communication chambers and (ii) causing the size of the at least one separation chamber to decrease by transmitting gas from the at least one separation chamber to at least one of the two respective communication chambers.

20. A balloon, comprising:
an envelope comprising one or more signal-passing sections, each of the one or more signal-passing sections being configured to allow a signal to pass through;
at least one signal receiver corresponding to a particular one of the one or more signal-passing sections; and
at least one signal-directing surface located on the surface of the envelope and corresponding to the particular one of the one or more signal-passing sections, the at least one signal-directing surface being configured to receive the signal and direct the signal towards the at least one signal receiver, and the at least one signal-directing surface extends inwardly from an inner surface of the envelope towards an interior of the envelope.

21. The balloon of claim 20, wherein the signal is an optical signal, and wherein the at least one signal-directing surface is an optically-reflective surface.

22. The balloon of claim 21, wherein the at least one signal-directing surface comprises a diffraction grating configured to direct the optical signal towards the at least one signal receiver.

23. The balloon of claim 20, wherein the signal is a radio-frequency (RF) signal, and wherein the at least one signal-directing surface is an RF-reflective surface.

24. The balloon of claim 23, wherein the at least one RF-reflective surface includes a diffraction grating configured to direct the RF signal towards the at least one signal receiver.

* * * * *